United States Patent
Gunasekar et al.

(10) Patent No.: US 8,140,980 B2
(45) Date of Patent: Mar. 20, 2012

(54) METHOD AND SYSTEM FOR PROVIDING CONFERENCING SERVICES

(75) Inventors: Guna Duraisamy Gunasekar, Cedar Rapids, IA (US); Mayel Espino, Colorado Springs, CO (US); Richard G. Moore, Cedar Rapids, IA (US); Michael B. Freeman, Colorado Springs, CO (US); Frank A. McKiel, Jr., Colorado Springs, CO (US); Paul A. Roberts, Alexandria, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 986 days.

(21) Appl. No.: 10/903,590

(22) Filed: Jul. 30, 2004

(65) Prior Publication Data

US 2005/0034079 A1 Feb. 10, 2005

Related U.S. Application Data

(60) Provisional application No. 60/492,597, filed on Aug. 5, 2003.

(51) Int. Cl.
G06F 3/00 (2006.01)
(52) U.S. Cl. .......................... 715/753; 715/816; 715/758
(58) Field of Classification Search .................. 715/758, 715/536, 753, 816; 704/3, 8; 709/204, 246
See application file for complete search history.

(56) References Cited

U.S. PATENT DOCUMENTS

| | | | |
|---|---|---|---|
| 4,630,235 A * | 12/1986 | Hashimoto et al. | 704/4 |
| 6,161,082 A * | 12/2000 | Goldberg et al. | 704/3 |
| 6,339,754 B1 * | 1/2002 | Flanagan et al. | 704/2 |
| 6,601,048 B1 | 7/2003 | Gavan et al. | |
| 2002/0073207 A1 | 6/2002 | Widger et al. | |
| 2003/0167279 A1 | 9/2003 | Smiga et al. | |
| 2003/0220972 A1 * | 11/2003 | Montet et al. | 709/204 |
| 2004/0102957 A1 * | 5/2004 | Levin | 704/3 |
| 2006/0133585 A1 * | 6/2006 | Daigle et al. | 379/88.06 |

FOREIGN PATENT DOCUMENTS

| | | |
|---|---|---|
| EP | 1304878 A1 | 4/2003 |
| WO | 9823075 A2 | 5/1998 |

OTHER PUBLICATIONS

Arango et al., "Media Gateway Control Protocol (MGCP), Version 1.0", Internet Engineering Task Force, Request for Comment 2705, Oct. 1999.

(Continued)

*Primary Examiner* — William Bashore
*Assistant Examiner* — Mylinh Tran

(57) ABSTRACT

An approach is provided for supporting multi-media conferencing. Textual information (e.g., text associated with a presentation) is received for display during a conference session to multiple participants. For a particular participant, configuration information corresponding to the participant specifies language assistance for the textual information. Language assistance involves augmenting the textual information according to the configuration information for comprehension of the textual information by the particular participant. In one embodiment, the augmented textual information includes language translation of the textual information. Additionally, the augmented textual information can encompass definitions of terms, including acronyms. The augmented textual information is forwarded for display to the participant during the conference session.

51 Claims, 17 Drawing Sheets

OTHER PUBLICATIONS

ITU-T "Gateway Control Protocol: Version 2", H.248.1, May 2002.
ITU-T "Packet-Based Multimedia Communications Systems", H.323, Jul. 2003.
ITU-T "Call Signalling Protocols and Media Stream Packetization for Packet-Based Multimedia Communications Systems", H225.0, Jul. 2003.
Day et al., "A Model for Presence and Instant Messaging", Internet Engineering Task Force, Request for Comment 2778, Feb. 2000.
Day et al., "Instant Messaging/Presence Protocol Requirements", Internet Engineering Task Force, Request for Comment 2779, Feb. 2000.
Rosenberg et al., "SIP: Session Initiation Protocol", Internet Engineering Task Force, Request for Comment 3261, Jun. 2002.
Supplementary European Search Report, PCT/US2004025021, Apr. 14, 2009, pp. 1-3.
International Search Report, WO 98/23075 A3, Jul. 16, 1998, pp. 1-5.

* cited by examiner

FIG. 5

DISPLAY OF INVITATION RESPONSE STATUS

FOR CONFERENCE *ABC* ON SEP. 22, 2020, 10:30 AM

| NAME OR ID OF INVITEE | REC'D | ACCEPTED | DECLINED |
|---|---|---|---|
| PARTICIPANT # 1 | ✓ | ✓ | ☐ |
| PARTICIPANT # 2 | ✓ | ☐ | ☐ |
| ------ | | | |

METHOD AND SYSTEM FOR PROVIDING CONFERENCING SERVICES

RELATED APPLICATIONS

This application is related to, and claims the benefit of the earlier filing date under 35 U.S.C. §119(e) of, U.S. Provisional Patent Application filed Aug. 5, 2003 (Ser. No. 60/492, 597), entitled "Conferencing Communications System"; the entirety of which is incorporated herein by reference.

FIELD OF THE INVENTION

The present invention relates to communications systems, and more particularly, to conferencing systems.

BACKGROUND OF THE INVENTION

Network service providers recognize the key role that conferencing services play in the conduct of modern business. Despite the evolution in communications infrastructure and associated services, advancements in conferencing facilities have remained relatively stagnant, with the focus on improving audio conferencing systems. Collaborative applications, such as whiteboarding, have emerged as tools that are helpful in supporting productive meetings. However, these applications have largely been implemented at the end user level, with little or no coordination with the conferencing facilities.

Conventionally, the approach to scheduling conferences among many participants is performed in an ad hoc manner, and is manually intensive. For example, when a manager wants to set up a meeting with his team members who are geographically dispersed, the manager typically instructs an assistant to contact each of the potential participants either through e-mail or telephone. Generally, this invitation and response process is performed several times until the assistant can establish a time that is suitable for all of the team members. Thereafter, the assistant can schedule a time slot with the service provider for reserving the conference bridge. Generally, this conference bridge is reserved well in advance of the actual meeting date. Even up to this point in the process, scheduling and coordinating calendars can be overly cumbersome, particularly if the number of participants is large. Moreover, during the time period between the set up and the meeting date, invariably one or more of the team members will have a conflict that arises, thereby necessitating rescheduling of the meeting. Consequently, the assistant will need to begin this process anew to schedule the meeting; otherwise absenteeism can hinder the productivity of the meeting or render it all together ineffective, especially if the key members are not there to provide input.

Additionally, after the extensive effort at scheduling the conference, traditional conference facilities provide no services that assist with improving the efficiency and effectiveness of the meeting. That is, the provider of the conferencing services now merely supplies circuits and ports on the conference bridge.

Therefore, there is a need for providing enhanced conferencing services to facilitate the scheduling and conducting of the meeting.

SUMMARY OF THE INVENTION

These and other needs are addressed by the present invention, in which an approach for providing multi-media conferencing supplies enhanced services to the participants of the conference session. The scheduling of the conference can be conducted collaboratively in a communications environment that supports a variety of media (e.g., e-mail, page, instant messaging, and Internet Protocol (IP) telephony). During the conference or meeting, a language assistance application can be invoked to augment textual information for comprehension of the textual information. For a particular participant, configuration information corresponding to the participant specifies the nature of the language assistance requested. Language assistance involves augmenting the textual information according to the configuration information, wherein the augmented textual information can include language translation of the textual information, as well as assistive or supplemental information for the textual information. In an exemplary embodiment, the supplemental information conveys definitions of terms, which can include acronyms and abbreviations. The augmented textual information is forwarded for display to the participant during the conference session. By supplying augmented textual information, the participants are less likely to interrupt the flow of the conference session, thereby enhancing the efficiency of the meeting. The above arrangement advantageously improves the efficiency and effectiveness of the conference session by conveying information tailored to individual participates. The above approach also permits the service providers to enhance their communication service offerings, thereby providing new sources of revenue.

According to one aspect of the present invention, a method for providing multi-media conferencing is disclosed. The method includes receiving textual information for display during a conference session among a plurality of participants. The method also includes retrieving configuration information specifying language assistance for the textual information, wherein the configuration information is associated with one of the participants. Additionally, the method includes augmenting the textual information according to the configuration information for comprehension of the textual information by the one participant. Further, the method includes forwarding the augmented textual information for display to the one participant during the conference session.

According to another aspect of the present invention, a system for providing multi-media conferencing is disclosed. The system includes a conference scheduling application configured to receive textual information for display during a conference session among a plurality of participants, and to retrieve configuration information specifying language assistance for the textual information, wherein the configuration information is associated with one of the participants. Also, the system includes a language assistance application configured to augment the textual information according to the configuration information for comprehension of the textual information by the one participant, wherein the augmented textual information is forwarded for display to the one participant during the conference session.

According to yet another aspect of the present invention, a computer-readable medium carrying one or more sequences of one or more instructions for providing multi-media conferencing is disclosed. The one or more sequences of one or more instructions including instructions which, when executed by one or more processors, cause the one or more processors to perform the steps of receiving textual information for display during a conference session among a plurality of participants; and retrieving configuration information specifying language assistance for the textual information. The configuration information is associated with one of the participants. Further steps include augmenting the textual information according to the configuration information for comprehension of the textual information by the one participant; and forwarding the augmented textual information for display to the one participant during the conference session.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a diagram of a graphical user interface (GUI) for displaying of an invitation response status, in accordance with an embodiment of the present invention;

DESCRIPTION OF THE PREFERRED EMBODIMENT

A system, method, and software for providing multi-media conferencing are described. In the following description, for the purposes of explanation, numerous specific details are set forth in order to provide a thorough understanding of the present invention. It is apparent, however, to one skilled in the art that the present invention can be practiced without these specific details or with an equivalent arrangement. In other instances, well-known structures and devices are shown in block diagram form in order to avoid unnecessarily obscuring the present invention.

Although the present invention is explained with respect to a specific communication and signaling protocols, the present invention also has applicability to other equivalent protocols. By way of example, these specific protocols include the Session Initiation Protocol (SIP) as specified in the Internet Engineering Task Force (IETF) Request For Comment (RFC) 3261, the Media Gateway Control Protocol (MGCP) according to RFC 2705, and the International Telecommunications Union (ITU) Recommendations H.323 and H.248; all of which are incorporated herein by reference in their entireties.

Figure 1:
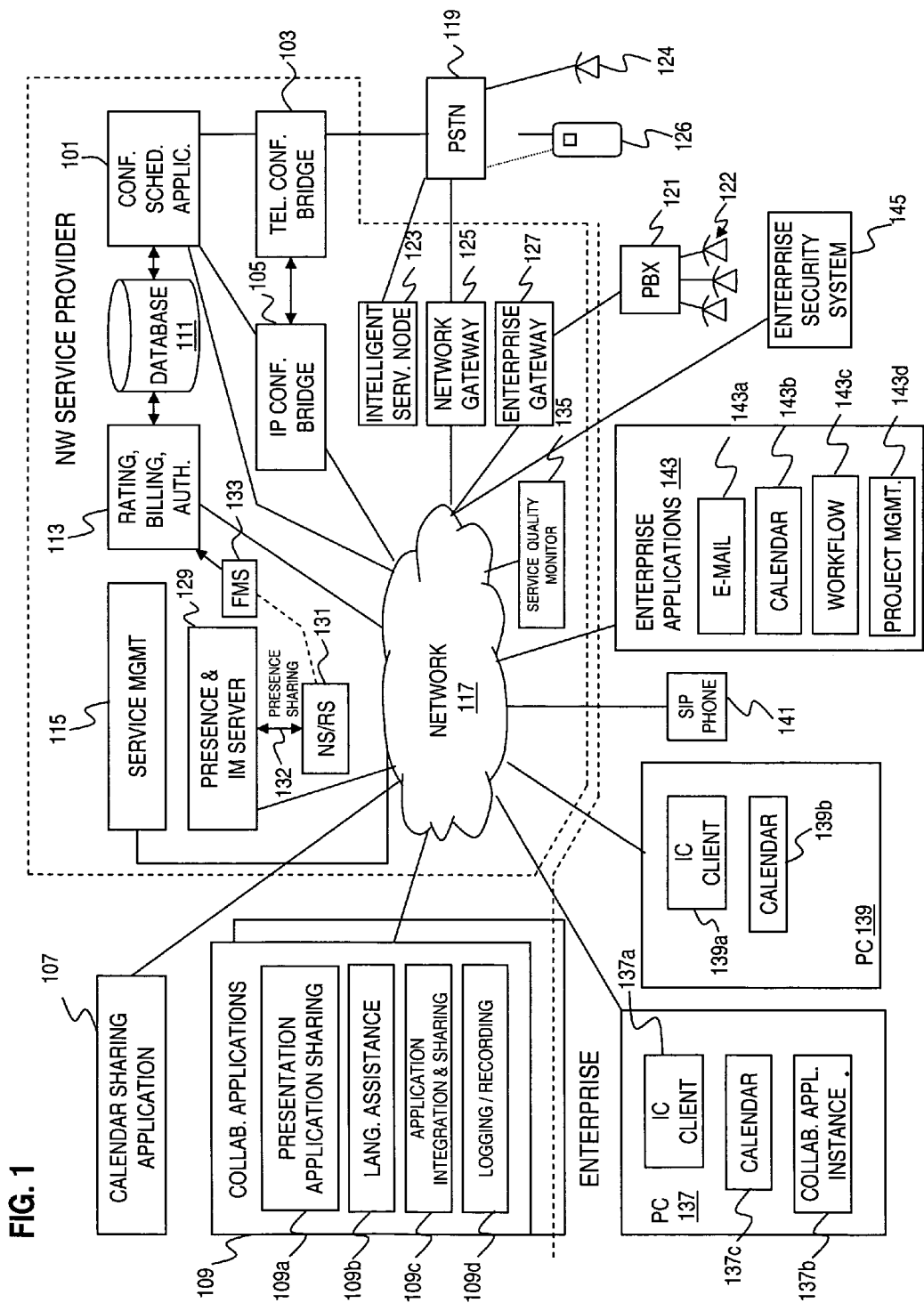
FIG. 1 is a diagram of a communication system providing multi-media conferencing services, according to an embodiment of the present invention.

FIG. 1 is a diagram of a communication system providing multi-media conferencing services, according to an embodiment of the present invention. Various elements shown in FIG. 1 cooperate to provide communication services among parties, including telephony, multi-party conferencing and collaborative communications. By way of example, conferencing services are supported by a network service provider, which supplies a conference scheduling application 101 that operates with a telephone conference bridge 103 and an Internet Protocol (IP) conference bridge 105. The bridges 103, 105 represent collections of resources that are allocated to various conferencing tasks. Although not shown, a video conferencing system may also be commercially operated by the service provider. This type of resource can be similarly allocated in support of conferencing services.

The conference scheduling application 101 provides resource management of both the telephone conference bridge 103 and the IP conference bridge 105. A service provider may have an overall capacity of hundreds or thousands of conferencing "ports"—referring to the number of separate connections that are supported at any one time. The conference scheduling application 101 processes requests to schedule a conference for a certain data and time, as well as a specified number of ports. The conference scheduling application 101 determines whether the request can be fulfilled and reserves (or allocates) the appropriate conferencing facilities. Additionally, the functions of the conference scheduling application 101 includes verifying schedules of physical facilities or equipment, as well as participants' individual schedules.

The conference scheduling application 101 also interacts with a calendar sharing application 107 and collaborative applications 109. These applications 109 can include a presentation sharing application 109a, a language assistance application 109b, an application integration and sharing program 109c, and a logging and recording application 109d.

These collaborative applications 109, according to one embodiment of the present invention, can run on servers (not shown) and are implemented as commercially hosted web services or are implemented as enterprise applications serving users within an enterprise or those who are able to access an enterprise network through, for example, a Virtual Private Network (VPN) arrangement.

Further, any one or all of these applications 109 can support a web-accessible interface and can be hosted as a service on server facilities independent from the network service provider (e.g., a third party apart from the network service provider and the enterprise). This type of service relates to so-called "web services," which are web-accessible applications hosted on, for example, server hardware of a first company and made available for use by, or on behalf of, a second company. In an exemplary embodiment, the conference scheduling application 101 can be accessible by web browser applications. In addition, the conference scheduling application 101 can also be a proprietary client-server application that enables users to conveniently schedule conferences.

The service provider can deploy a web server (not shown) as an interface between systems external to the service provider and those systems that are internal to the service provider. It is contemplated that the web server supports adequate privacy and security measures via user authentication. The web server can provide the user with the following functions: checking of status of a meeting, obtaining status on acknowledgement of participating parties, obtaining status on attendance confirmation of participating parties, modifying parameters set by the conference wizard (can be offered only for the initiator of the conference or a "super" user), and reviewing (and selecting and modifying) the list of services/resources available for the meeting.

The collaborative applications 109 allow multiple parties using web browsers or specialized applications to simultaneously view and/or act upon a common view of a document, presentation or other data object. An example of a collaborative application is a document editor wherein multiple parties can view a common document and provide editing input, or even share editing control, to modify the document while viewing it. Another example is a common whiteboard wherein multiple parties can view a graphical workspace and may take turns modifying or adding to the content. Other advanced tools include collaborative computer-aided design (CAD) tools, whereby engineers working at different locations may collaboratively design and view manufacturable parts or data models. The collaborative applications 109 can also provide for parallel text messaging and audio conferencing as part of the communication session, as well as support live video to provide face-to-face interaction. Also, these collaborative applications 109 can provide for a session "owner" or "moderator," who exercises control over the session, to delegate editing control to other parties.

According to one embodiment of the present invention, the application integration and sharing 109c is a server process for enabling collaboration among multiple client application instances.

The conference logging and recording application 109d allows for logging of events pertaining to a conference session and recording of the conduct of the session as well as the content of the session. Logging of events include, for example, start time, stop time, sign-on and sign-off times of each participant, along with indexing markers or annotations inserted during the session by a presenter or participants. The recording process, for instance, includes recording video, audio, textual messaging conversations, presentations and collaborative work as well as data items, such as documents or images, which are introduced by participants in the course of the meeting. Recording may also involve manual or automatic note taking, vote tallies, meeting minutes or meeting transcripts.

The conference scheduling application 101 accesses data from a database 111, which stores records of allocated conferencing resources and other pertinent data. The database 111 also connects to a billing system 113 that provides Rating, Billing, and Authorization (RBA) functions. Thus, the billing system 113 can use the database 111 to store account information or records of billing-related events received from other elements. The rating, billing, and authorization functions measure the usage of the communication services offered by the network service provider and determine billing for the usage. The billing system 113 receives notifications from other network elements indicating the nature and amount of services provided, such as the duration of telephone calls or video conferences. The billing system 113 can also be involved in determining whether to honor requests for service based upon the ability of parties accessing the system to arrange for payment to the service provider.

The network service provider employs a service management system 115 in support of various management functions for controlling the conferencing services.

A communications network 117 provides communications among the processes and sub-systems of the network service provider. For the purposes of explanation, numerous elements in FIG. 1 are shown as having connections to the network 117. However, it is recognized that the network 117 can include multiple interconnected networks, with connectivity, for example, to the global Internet (not shown) or other public data networks. The network 117, in an exemplary embodiment, is a data transport network, such as an Internet Protocol (IP)-based network, an Asynchronous Transfer Mode (ATM) network, a frame relay network, or a combination thereof. The network 117 interfaces with telephony systems, such as a Public Switched Telephone Network (PSTN) 119 and a Private Branch Exchange (PBX) 121, via the following nodes: an Intelligent Service Node (ISN) 123, a network gateway 125, and an enterprise gateway 127.

The ISN 123 is a voice service platform that can include both human telephone operators and automatic voice response units (VRUs) capable of receiving telephone calls and providing interaction with callers. For example, the ISN 123 utilizes a VRU function by which a caller is provided with automatic prompts and may traverse a menu structure by providing Dual Tone Multi-Frequency (DTMF) tones or spoken input to the system. The ISN 123, as a voice service platform, provides a service by taking action in response to caller input, such as retrieving information for the caller, connecting a telephone call, or performing transactions.

The network gateway 125 provides an interface between the network 117 and the PSTN 119. For example, the network gateway 125 may participate in Session Initiation Protocol (SIP) signaling on the data network side and present an Integrated Services Digital Network (ISDN) interface or Signaling System 7 (SS7) signaling interface to the PSTN 119. As for the bearer channel for carrying telephony audio signals, the network gateway 125 converts among streaming data representing digitized audio in the network 117 and analog, or Time Division Multiplexing (TDM), signals suitable for the conventional PSTN 119. The network gateway 125 enables a party using a SIP phone 141 to call, or be called by, a party using a conventional phone such as telephone 124 or a wireless phone 126. It is noted that the SIP phone 141 can be implemented as a stand-alone device or a software client.

Similarly, the enterprise gateway 130 couples the network 117 to a private branch exchange (PBX) 121, which supports one or more PBX telephones 122. In this example, the PBX 121 resides at the customer premise of a business organization. The PBX 121 is often of proprietary design and function, but presents a standard signaling and trunk interface in order to be connected to conventional telephone networks. For phone 122 to reach or be reached by other phones coupled through the network 117, the enterprise gateway 130 appropriately adapts signaling and bearer channel information to support such communication.

The Network Service Provider additionally utilizes a Presence and Instant Messaging (IM) server 129 for determining whether a user is currently participating in an online communication session—i.e., instant communication session. The Presence and IM server 129 can be a real-time communications server that supports text messaging and presence indication. As use herein, "presence" generally refers to the technique of indicating to one party whether another party is available to communicate and often further indicating what mode of communication is available or preferred. The Presence and IM server 129 may operate as a presence server of the type described in Request For Comments (RFC) 2778 and RFC 2779 developed by the Internet Engineering Task Force (IETF); these documents are incorporated herein by reference in their entireties. The Presence and IM server 129 receives presence indication from parties, usually through their use of client applications similar to client 107. Examples of such applications include AOL Instant Messenger (AIM) client, and a Microsoft Real-Time Communications (RTC) client, such as Windows Messenger.

The Presence and IM server 129 alerts interested parties whether a particular party has indicated that they are present. This facilitates the ease and spontaneity with which parties may initiate conversations with one another. For establishing communications among parties, the server 129 may employ the Session Initiation Protocol (SIP) as described in IETF RFC 3261, which is incorporated herein by reference in its entirety. In addition to text messaging sessions, the Presence and IM server 129 may facilitate audio or video communications among IC clients 137a, 139a.

The Presence and IM server 129 exchanges presence information with SIP Network Server and Redirect Server (NS/RS) 131, which interact with the billing system 113 via a Fraud Management System (FMS) 133. In an exemplary embodiment, the Rating, Billing and Authorization function may subsume or communicate with the FMS. FMS 133 is used by the network service provider to detect and curtail fraudulent or abusive use of the network as well as misuse or "hacking" of network facilities and resources. As indicated previously, the RBA function can receive event notifications from a wide variety of elements that experience or observe usage by users of the system. As various notifications are received from elements throughout the system related to usage or attempted usage, much of the same information used for billing purposes may also be used for monitoring of activity for the purpose of detecting fraud or abuse. Commonly assigned U.S. Pat. No. 6,601,048 to Gavan, et al., which is incorporated herein in its entirety, describes a suitable method by which the FMS 133 may process event notifications and facilitate the detection of possible fraud or abuse.

To further curb the possibility of unauthorized access or use of the system or its resources, the RBA function or some other supervisory function operated for the benefit of the network service provider may coordinate with an enterprise security function. This interchange of information may be used to, for example, involve an employee directory or authorization records maintained by the enterprise in decisions by the service provider's system as to whether to fulfill requests to establish communications, schedule conferences, etc.

Yet another measure for detecting fraud or breaches of security and privacy, relates to the manner in which presence information held in NS/RS 131 or Presence and IM server 129 may be correlated with live conference attendee information known to collaborative applications 109 or conference bridges 103, 105 (in FIG. 1). Discrepancies in these pieces of information pertaining to the whereabouts and identity of a person can be detected. For example, a person registering presence at a given SIP phone that is known to have a particular physical location at the same time that they are involved in a conference from what is known to be an entirely different location may signify falsification by another party at either the phone or the conference. This occurrence may have a logical explanation in some circumstances, but may nevertheless warrant investigation.

Another protection may be realized in monitoring and controlling outbound dialing occurring from conferences that are already underway. Authorizations, abusive patterns among call participants and account balances may all be applied to controlling aspects of conferencing and collaboration service invocation.

The NS/RS 131 is optionally implemented as a combination of two SIP components: a network server (NS) or "proxy" function; and a redirect server (RS) or location server function. The NS function has responsibility for locating and establishing contact with a party. The NS creates and dispatches messages to other elements to coordinate the providing of services. If there is any "statefulness" in the course of processing a session request (e.g., a telephone call), it is the NS that holds such state. For example, in the context of a "find-me" feature, wherein a series of contacts is to be tried in sequence, the NS sends SIP "INVITE" messages or the like to each contact and keeps track of which contacts have responded and which contacts have yet to be tried.

The NS/RS 131 can interface to a Service Control Point (SCP) (not shown) in a traditional telephony intelligent network (IN) environment for various purposes. For example, in some implementations, VPN routing of telephone calls are performed in both a conventional telephone network and a packet switched telephony system that uses the network 117. A single version of the routing information are maintained in the SCP rather than having to synchronize SCP contents and RS contents. The main purpose of the RS function is to maintain profile information pertaining to the users. In a sense, the RS function also keeps track of where or how a user can be contacted at any point in time. As users move about physically or logically from one terminal device to another and "register" their presence, the RS receives notifications from the users as to their latest location.

Presence-type information maintained by the RS function of the NS/RS 131 is similar to information supplied by the Presence and IM server 129. Consequently, a presence-sharing connection 132 is provided for sharing of such information among these entities 129, 131. For example, the indication of presence by a party via an instant communications client is used to update presence information in the NS/RS 131. This information can be used, for example, to complete telephone calls to the relevant party.

The fact that the scheduling application 101 or collaborative application 109 may sense when a given party is involved in a scheduled conference may be used to temporarily alter behavior of a user's profile in a redirect server of NS/RS 131 such that inbound calls may be handled differently without the user having to explicitly make changes to the profile. Likewise, the detection of the conclusion of the conference may cause the profile behavior to revert to normal "in the office" handling or whatever mode of operation is appropriate.

In contrast to the NS function, the RS function generally does not maintain state information or carry out the mechanics of processing a call or session request. The RS is utilized as a repository for profile and contact information. Upon receiving a request from one party to establish communications with another party, the NS consults the RS for routing information. The RS reviews user profiles of one or both of the communicating parties and applies any applicable features, such as find-me or call blocking that may affect the applicable contact list for a given party. The RS provides the list of contact information to the NS so that the NS may then commence to try the contacts.

The profiles that the RS uses to affect processing of session requests are maintained by the Service Management function 115. The Service Management function 115 provides the capability to edit contents of stored profiles and to perform validity checking and policy enforcement on the profile contents. Additionally, the Service Management function 115 is employed by the network service provider to control user features. Some aspects of control through the Service Management function 115 may also be made available to users of the network so that the users or subscribers can customize their own features.

According to one embodiment of the present invention, the functions and services provided by the Presence and IM server 129 can be supplied to the enterprise as a paid service.

To ensure acceptable performance, a Service Quality Monitor server 135 is utilized to track the parameters relating to the service quality of the communication sessions supported by the network 117.

Under this scenario, the network 117 serves the various communication needs of an enterprise, which utilizes multiple hosts (personal computers 137, 139), a Voice Over IP phone (e.g., SIP phone) 141, and a number of enterprise applications 143. These enterprise applications 143 can include e-mail 143*a*, calendar 143*b*, workflow 143*c*, a project management and organization chart 143*d*.

The e-mail application 143*a* can be implemented in a typical e-mail server for receiving, storing, and routing e-mail messages among enterprise clients and outside parties. The workflow application 143*c* is a business process automation tool, which handles the routing of work items among different departments or individuals in an organization to implement a consistent business process. As will be more fully described with respect to FIG. 14, the workflow process can be enhanced with presence information.

The enterprise calendar application 143*b* provides scheduling function across the enterprise. Many other enterprise applications, such as time sheet management and inventory tracking applications, are well known and are included in the set of enterprise applications 143. On the client side, the PCs 137, 139 also include calendar applications 137*c*, 139*b* respectively. The PC 139 can execute a program that acts as a background client database access point. The program has access to databases that store the user's information about calendaring and contacts. In an exemplary embodiment, the program can access databases accessible by Microsoft Office Phone Accelerator. Further, the program can contact the conferencing system to update the database 111 with information maintained by the user's databases. The program can control certain resources of the user's PC 139 act on behalf of the conferencing system.

The project management or organization chart application 143*d* provides another form of application integration. For instance, the invitees to a communications sessions such as conferences and collaborative sessions may change dynamically in response to groupings identified in a project management tool or a position in an organizational chart. It may be desirable to establish a conference or collaboration with whomever is serving in particular role, regardless of the particular names involved. This approach allows the manager to change assignments in the project management environment and not have to go into a separate communications-oriented address book to update such information or have to remember names and addresses corresponding to people performing in each role. The behavior of the communications support system automatically tracks the changes in assignments recorded in the project management application 143*d*.

In general, communications may be addressed to a group name or a "role name" or title and the communications or scheduling system consults the other applications to resolve the group or role identifier to a list of one or more contacts.

A similar effect may be employed for temporary delegation, for example when one party leaves another party in charge of certain duties while they are away. When a person indicates delegation of responsibilities, such as signature authority, in another tool such as a workflow tool, a communications/scheduling tool may correspondingly direct invitations to the delegate in lieu of the named party. Resolution may take place based on name or e-mail address rather than requiring that the intended party be identified by role name as described above.

This delegation behavior may differ from the mere forwarding of e-mail to the delegate that was originally addressed to the delegating party. The full richness of the delegate's own communications preferences, such as "Find-me" functionality and multiple modes of communication, may be employed by the communications system to reach the delegate, according to the various ways provided for in SIP-controlled communications systems.

Also, context-sensitive delegation is possible. A selective delegation of responsibilities with regard to a specific topic or project may be supported across all manner of communications in the system of FIG. 1. E-mail and workflow items may be routed to a delegate based upon content or subject line (as described later with respect to FIG. 14). Even phone calls established using a SIP mechanism may bear a subject line header in the signaling information and may be selectively redirected based on this information.

It is contemplated that from within the project management or organization chart application 143*d*, the conferencing capabilities of the system of FIG. 1 can be invoked based on the information contained within the application.

The enterprise applications can be hosted on computing servers maintained by the enterprise and housed at enterprise facilities. These applications are accessible to enterprise personnel through an enterprise data network. Although not shown, the enterprise can employ one or more local area network (LANs) or wide area networks (WANs) to which the hosts 137, 139 (e.g., workstations and servers) can access the network 117 and provide connectivity to the enterprise. Such internal networks can be protected by the enterprise security system 145, which can implement a firewall for access to the Internet or to an external data network. For the purposes of explanation, the network 117 can effectively be regarded as a single contiguous information transport network.

Further, the enterprise can deploy an enterprise security system 145 for effecting security policies and mechanisms (e.g., firewalls) within the enterprise network. The system 145 can communicate with the service provider over the network 117 to coordinate and implement security measures.

As an example of the diversity of communication media within the enterprise, it is assumed that user of the PC 137 seeks to communicate with a user of the PC 139. Such communication can be accomplished in a variety of ways. These parties can perform text messaging ("chat") with one another using applications, such as instant communications client 137a, executed on the PCs 137, 139. Alternatively, these parties may converse by conventional telephones, PBX telephones, or by the use of SIP telephony applications on the computers or SIP phones 141 coupled to the network 117.

These parties can also engage in live video, or collaborative interactions, wherein other modes of communication are used in parallel (i.e., concurrently) with the collaborative applications 109. For example, the parties may collaborate on editing a document using their respective workstations, while discussing the work over a telephone connection.

For collaborative interactions, the PC 137 can execute an application instance 137b with collaboration capabilities; the instance 137b represents a client application (for example, a stand alone executable or an application provided by a web browser using such exemplary tools as applets, Java Server Pages (JSP), etc., by which the PC 137 can participate in collaboration via one or more collaborative applications 109. For example, the application instance 137b can be a Project Management Application, a Resource Management Application, or a Financial Management Application integrated with collaboration-related tools or functions such as presence, sharing, and etc. The counterpart process to the application instance 137b is the application integration and sharing program 109c.

With the services offered by the network service provider via the network 117, the many network elements of FIG. 1 can exchange various information, including signaling, digitized audio signals, video, data files, SIP messages, text messaging, presence-related registrations and inquiries, images, authentications, billing-related events, etc. Both signaling and information traffic are communicated among the elements through the network 117. Digitized audio signals are as a stream of packetized data according to, in an exemplary embodiment, the International Telecommunications Union (ITU) H.225 protocol suite, including the Real-time Transport Protocol (RTP).

With respect to the conferencing services, the telephone conferencing bridge 103 couples to the PSTN 119 to provide an audio conferencing bridge that multiple parties may dial into to communicate with one another. Although FIG. 1 shows the bridge 103 interfacing with the PSTN 119, it is contemplated that the service provider can own and operate some telephony switches, such as Class 3 switches, that are viewed as being a part of the PSTN 119 and may couple parties over a wide geographical area into the bridge 103 through a network of one or more Class 3 or Class 4 telephony switches.

Whereas the telephone conferencing bridge 103 provides conferencing among parties who are coupled through the PSTN 119, the Internet Protocol (IP) conferencing bridge 105 serves parties who are engaging in telephony via the data network 117. It is recognized that, by the presence of the network gateway 125, either the IP conferencing bridge 105 or the telephone conferencing bridge 103 can be used to conference a mixture of parties who are using traditional telephony as well as voice-over-packet technologies. For example, the SIP phone 141 may participate in a conference along with one or more conventional telephones 122, 124 using the telephone conferencing bridge 103. To accomplish this, the SIP phone 141 can establish a two-way RTP audio connection with the gateway 125, which extends as a telephony connection through PSTN 119 and to the bridge 103.

In a voice-over-packet environment, the bridge 105 performs the equivalent function of a conventional audio bridge in processing audio signals from multiple parties coupled to the bridge 105. The IP conferencing bridge 105 can support two-way RTP stream connectivity with multiple sources and processes, wherein the various incoming digitized audio streams are combined or selectively gated, and subsequently, dispatched to the conference participants. The IP conferencing bridge 105 may also operate to serve as a video or multimedia conferencing bridge. To establish the multiple packet telephony connections, the bridge 105 is configured to conform to such standard signaling protocols as International Telecommunications Union (ITU) H.323 or SIP. The IP conferencing bridge 105 can also be referred to as a "conferencing server."

Yet another approach for accommodating both IP phones and conventional telephones involves coupling the two types of conference bridges 103, 105 to one another. This coupling can be readily accomplished, particularly if both bridges 103, 105 are under control of a common service provider.

According to one embodiment of the present invention, each conference participant has a corresponding data profile. The data profile may include an image, a sound bite, a video clip, or an animated graphical presentation to be presented to callers either while in conference or while being summoned or while on hold.

The conferencing system may display each remote party by an image on the screen, perhaps as a static image in lieu of full motion video. The view may show an array of "head shots" of each participant. As each person talks, their corresponding image on the interface changes in some manner to highlight the source of the speaking. Alternatively, to save space while using a collaborative whiteboard for example, a single space for showing these images is provided and the image in this space changes to reflect whoever is speaking or dominating the bridge at that moment. The conferencing bridge 103, 105 (or server) can sense which input channel is dominant (either due to automatic volumes sensing or due to active control by a moderator) and send this information along to the various client applications or devices being used by each participant. It is contemplated that a person participating via a RTP audio session or a conventional telephone call might nevertheless have an interface on a workstation that displays the various parties on the call and indicates who is speaking at any given moment. This may be achieved by communications from the conferencing bridge 103, 105 or the collaborative application 109 to a workstation application resident on PCs 137, 139. Whereas the images or identifiers for the participants may have been communicated earlier at the commencement of the conference or as part of the invitation, the real-time display of currently talking parties may use the same identifiers or some other suitable mapping that adequately matches the dominant speaker to their respective display position.

Another data element available from the participant may be a business card, resume, or other textual data that is immediately viewable to other participants without having to be explicitly uploaded or displayed during the conference. In other words, every time a person participates in a conference, their electronic business card is automatically available to everyone else because it is provided in their profile information. Participant user interfaces may allow for selecting or activating a name, identifier or image corresponding participant to have the corresponding data presented for viewing or downloaded, such as into an address book or business contact database. An alternative may be a user interface control that, when selected or activated, performs a similar retrieval or display operation pertaining to whoever is speaking or dominating the bridge at that moment. The information may reside in a database (e.g., NS/RS 131) that is accessible to conferencing or collaborative applications servers. This information may be cached as each participant enters the conference or may be obtained prior to the commencement of the conference session. Alternatively, information such as SIP signaling messages used to join each participant to the conference may be augmented by a short data stream pertaining to the participant or pointing to a source of further information.

The conference scheduling application 101 can also provide automatic identification of the caller. The capability is particularly useful in conferences that involve a very large number of participants. For example, a company executive may wish to address a large number of employees and perform essentially a unidirectional broadcast. This situation is often handled differently than a conventional audio bridge conference session. To manage the large number of audio inputs and prevent talkers and extraneous noises from interrupting the conference, the many channels are coupled to the audio bridge in a listen-only mode. The incoming lines are coupled to a conference operator or moderator. If and when the session is opened for questions from the participants, each participant wanting to talk may indicate a desire to do so by pressing a key on a telephone keypad or otherwise summoning the attention of the moderator so that the participant may be queued for being able to talk on the bridge.

Another aspect of these types of calls is that, as each party joins the conference call, the moderator asks each party to identify themselves. This may be used for authentication purposes and may also be used by the moderator to introduce the participant to the listening audience when the participant is later granted permission to speak. In accordance with the present teachings, presence information maintained within Presence and IM server 129 or NS/RS 131 may be used to provide or confirm the identity of a participant for the benefit of a moderator in these situations.

It is contemplated that system of FIG. 1 support rollover into conferencing or collaboration from chat or other modalities. In other words, users involved in communications sessions should be able to freely add or delete modes of communication (e.g., chat, voice, shared whiteboard, extra participants) without having to drop communications altogether or make pre-arrangements. The service provider should also be able to monitor the setup and dissolution of a variety of sessions and be able to accurately bill for such usage.

Throughout the description of various features and processes mentioned above, there are opportunities to take into account relative priorities and deciding whether one interest prevails over another. Relative priorities may be applied as various parties or project activities vie for conferencing resources or as urgent work items and events compete for the time of a busy enterprise employee.

It is contemplated that the conferencing services supported by the bridges 103, 105 are provided as revenue-producing services by the network service provider. Accordingly, the billing system may play an integral role in a commercial service.

Figure 2:
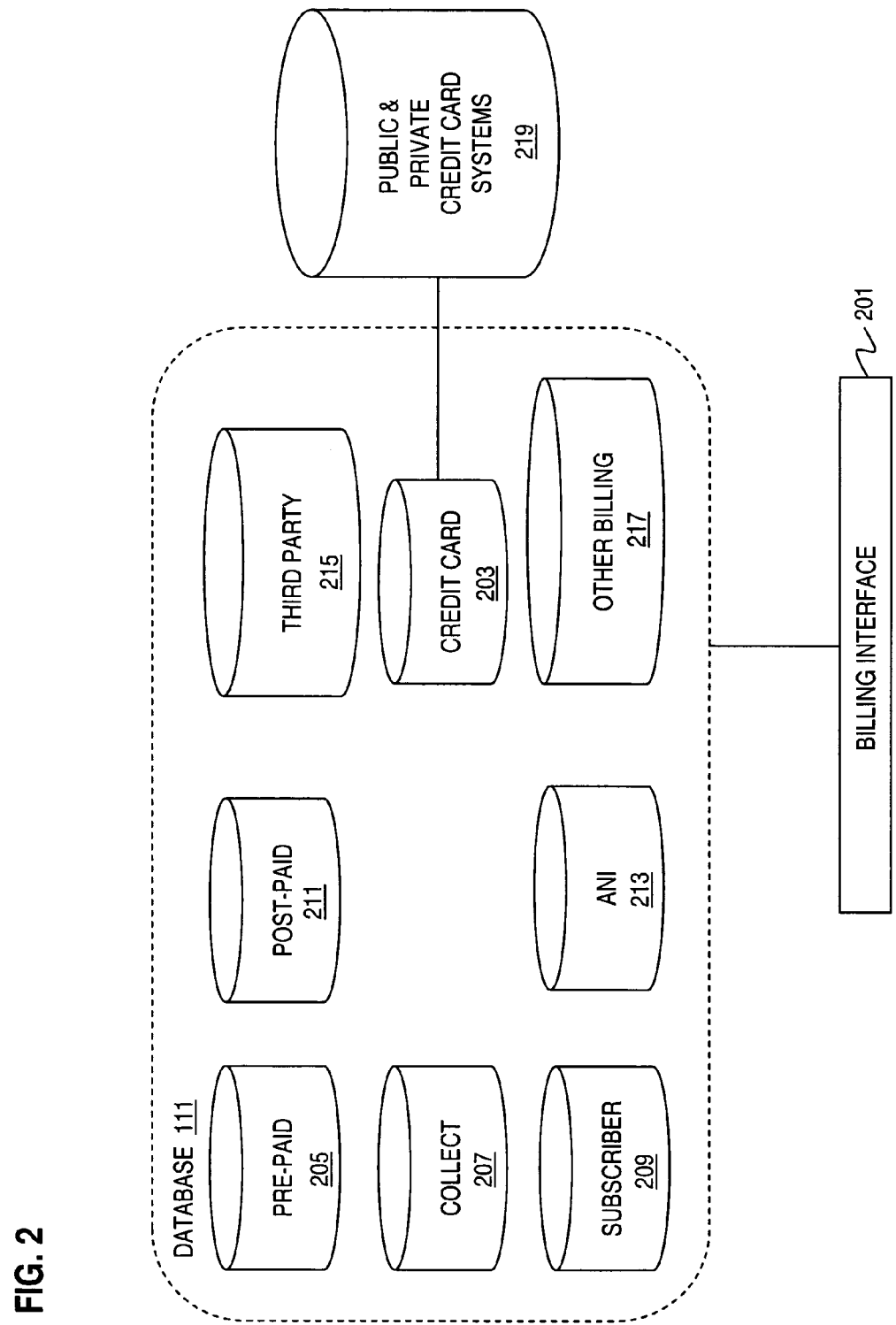
FIG. 2 is a diagram of a billing system supporting multi-media conferencing services, according to an embodiment of the present invention.

FIG. 2 is a diagram of a billing system supporting multimedia conferencing services, according to an embodiment of the present invention. The features and activities involved in serving users with conferencing, collaboration and other service aspects constitute billable usage for which the network service provider may charge the users. For example, usage are measured by, or billing charges are calculated based upon, each instance of use of a service, frequency or volume or duration of use, availability of a service over a period of time (flat rate) or a number of conferencing ports occupied during a session. Users may also pay for premium or customized services such as having preconfigured custom data (e.g., electronic business card) being available to other parties during conferencing or special features such as language translation during conferencing or invitation response monitoring/notification in a scheduling application.

Referring now to FIG. 2, the database 111 comprises multiple databases in support of the billing, rating and authorization function of the billing system 113, in accordance with an embodiment of the present invention. The billing database 111 couples to a billing interface 201 that creates billing records within the billing database 111 in response to event notifications that are received from various network elements in the system of FIG. 1. These event notifications are indicative of service usage by the users. The billing system 113 are implemented, for example, as one or more server computer systems that executes billing interface 201 in software to collect usage-related information from other elements. A similar billing function is operated by a service provider that hosts collaborative applications 109 and/or calendar sharing applications 107.

As mentioned, the billing system 113 collects and processes event notifications from other elements indicative of usage. The billing system 113 also compares notifications or records from various sources to compile event records that are related to a common conference session or common instance of usage. Additionally, the billing system 113 determines apportionment of charges and resolves how charges should be billed and who should be billed. As evident in FIG. 2, one option involves use of a credit card database 203 that can be coupled to external credit card systems 344. This is noteworthy in that users, who are not pre-subscribed to some services, may nevertheless use the system spontaneously as long as they are able to provide for some means of payment. This is referred to as "walk-in" or random business, as opposed to subscribed or contractually prearranged business arrangements.

Another role of the billing system 113 is to authorize the accessing and usage of system resources based upon the ability of a party to pay for usage. In other words, when a user initiates a scheduling request or an actual communications or conference session, the billing system 113 determines whether the user has an account in good standing to which charges are applied. Furthermore, a balance related to a charge account limit or pre-paid account of some nature are debited and tested, while the user uses the system. The use of the system can be terminated, perhaps with advance warning to the user, upon the account balance being exhausted.

The billing database 111, by way of example, comprises a number of individual databases, each representing a particular method of billing: a Pre-Paid database 205, a Collect database 207, a Subscriber database 209, a Post-paid database 211, an Automatic Number Identification (ANI) database 213, a Third Party database 215, as well as an Other Billing database 217 to accommodate various other billing methods. Each individual database can be implemented by a standalone database containing records of accounts or can be an interface to an external system, such as a validation system operated by a credit card company. The description of the databases 205-217 is enumerated below in Table 1.

TABLE 1

| Database | Description |
| --- | --- |
| Pre-paid database 205 | User purchases services prior to use, and billing system deducts value of services from pre-paid balance |

TABLE 1-continued

| Database | Description |
| --- | --- |
| Post-paid database 211 | User pays for services after use |
| Collect database 207 | Bills conferencing and communications services to called party's telephony or communication services account |
| Credit card database 203 | Bills conferencing and communications services against user's credit card account |
| Subscriber database 209 | Bills conferencing and communications services to subscribed services account |
| ANI database 213 | Bills conferencing and communications services to user's associated telephony services account |
| Third Party 215 | Bills conferencing and communications services to user's account with third party, such as another service provider or commercial entity |

As indicated by the Other billing database 217, the above billing methodologies are not exclusive, but are instead merely illustrative of some of the billing options that can be used to receive value in exchange for the provision of chat-based services. It is noted that the various databases 203-217 can communicate with external systems for maintaining its data. For example, the Credit Card database 203 couples to a credit card system 219. The billing functionality can be logically or physically centralized or distributed and can be integrated to varying degrees with other network elements within the system of FIG. 1.

Figure 3:
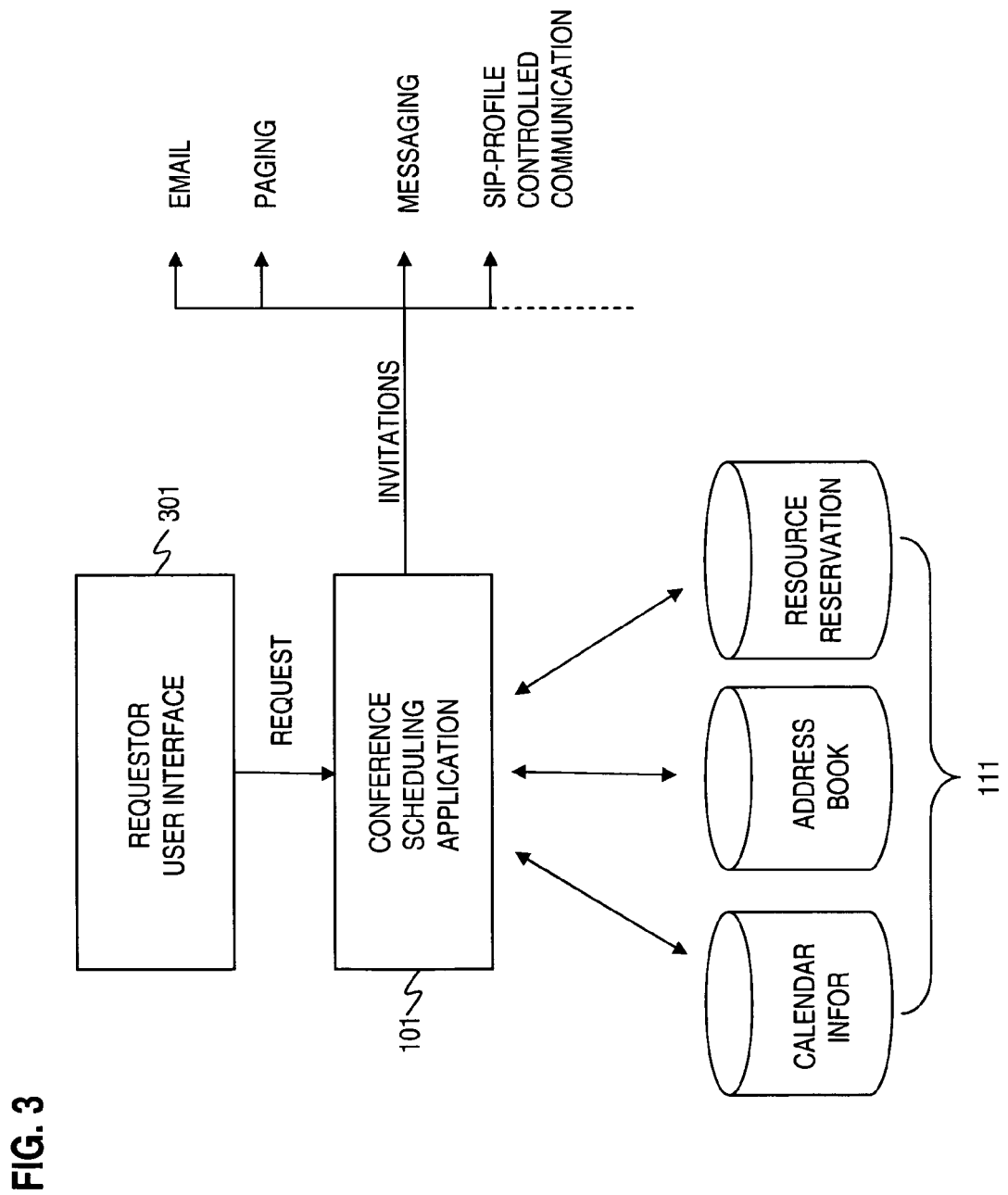
FIG. 3 is a diagram of a conference scheduling application utilizing invitation messages to establish a conference, in accordance with an embodiment of the present invention.

FIG. 3 is a diagram of a conference scheduling application utilizing invitation messages to establish a conference, in accordance with an embodiment of the present invention. The scheduling of conferences and collaborative sessions may itself be provided in a collaborative manner. That is, multiple parties already in communication through some means (e.g., telephone session, chat session, etc.) may access a common view of facility/personnel availability and mutually agree upon an acceptable time and place. The above capability is particularly useful when, as one collaboration session draws to a close, the participants can then agree upon a follow-on meeting without having to leave the context of the present session. A common-view calendar, with personal schedules of the attendees collectively superimposed, can be invoked during any conference session. This involves integration with the various forms of calendar and personal scheduling tools, as more fully described later.

As seen in FIG. 3, a participant transmits a request via a user interface 301, such as the collaborative application instance 137b, to the conference scheduling application 101. The application 101 in turn accesses the necessary information from the database 111 to create invitations to the other participants. In this example, the database 111 stores calendar information specifying schedules of the particular participants, address book information, and resource reservation information. The invitations are transmitted to the participants according to their respective profiles. For instance, the invitations can be sent based on the delivery mechanisms specified in the profiles. These mechanisms can include e-mail, paging, and instant messaging.

As an invitation to a meeting, conference or collaboration session is sent out, the invitation may contain elements that interact with a calendar application 137c, 139b (e.g., Microsoft Outlook) to cause the meeting to be automatically noted as an event on the personal schedule of the invitee, wherein an e-mail notification contains information that causes a scheduled event to be added to a participant's calendar. The notification can include an icon signifying the nature of the event so that, in a graphical rendering of the calendar, the icon provides a visually compact reminder of the nature of the event, such as a logo of a particular organization to denote a meeting of that organization.

Traditionally, calendar applications employ a fixed set of symbols to represent various types of events. However, the present invention, according to one embodiment, advantageously allows for sending of an arbitrary icon. This is highly flexible and enables the sender to make effective use of the invitation as a reminder.

In addition to the participants themselves having the capability to collaboratively establish a conference, the conference scheduling application 101 supports conference setup by a third party. For example, in some environments, it is desirable to allow a third-party, such as an administrative assistant, to set up conferences and collaborative sessions on behalf of the participants. This is important where a physical conference room needs to be scheduled in conjunction with the reservation. Where a service provider operates or hosts a conference scheduling application, an interface is provided wherein authorization to perform actions on behalf of others is configurable by the service provider or by a responsible party at the enterprise.

Upon receipt of the invitation, the invitee can accept or decline the invitation to join the conference via a number of communication mechanisms, as next described.

Figure 4:
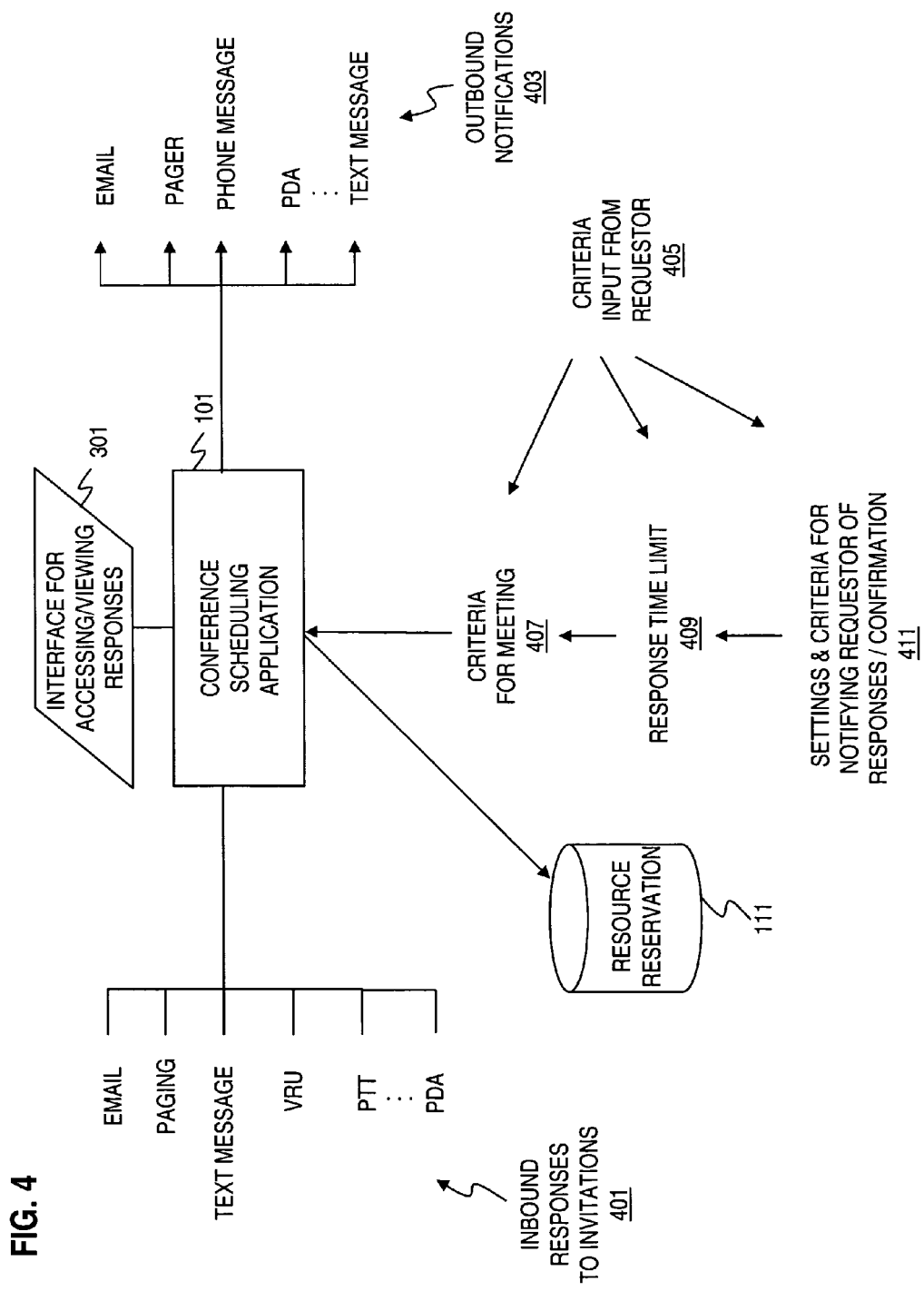
FIG. 4 is a diagram of a response process supported by the conference scheduling application, in accordance with an embodiment of the present invention.

FIG. 4 is a diagram of a response process supported by the conference scheduling application, in accordance with an embodiment of the present invention. Continuing with the example of FIG. 3, the inbound response 401 by an invitee to an invitation can be provided via a number of mechanisms can be employed, including for example: e-mail, phone, text message, two-way pager or Personal Digital Assistant (PDA), Voice Response Unit (VRU), web application, and push-to-talk (PTT) feature on a wireless phone and instant messaging. Depending on the type of medium supported by the communication systems involved or the capabilities of requestor and invitee, the invitation can further include a mechanism to facilitate responding to the invitation.

The composing and embedding of response addresses in an invitation to facilitate responding to the invitation may depend on the type of communications used to send the invitation. For example, a telephone message can issue a callback telephone number before listing other response alternatives, such as an e-mail address. On the other hand, an invitation sent via instant messaging may provide a response screen name first, followed by e-mail or telephone number information. An e-mail invitation can supply a telephone number that is dialed and a Uniform Resource Locator (URL) hyperlink pointing to a web page, or an IM chat icon. Of course, the invitee can respond simply by replying to the e-mail. The telephone number that is provided in the e-mail invitation (or page) can be to an automated VRU, such as the Intelligent Service Node 123, to provide a response to the invitation. A connection is provided by which a voice response interaction with a user who has "dialed in" to respond to an invitation are used to update an invitation response status within conference scheduling application 101.

In addition, a paging message can be sent to a pager to provide a telephone number or text message indicating how the invitation is answered. In the case of a two-way pager, acknowledgement of receipt of a page is monitored to indicate receipt status to a requestor. The two-way paging system can provide for Yes/No answers or even full text to be sent as a response via e-mail. It is recognized that some paging systems can also detect successful dispatching or receipt of a page even if there is no capability to support full two-way text messaging.

A web-based application may receive responses to invitations so that a participant can respond from any workstation with a web browser application. Under this scenario, network security measures can be taken, such as secured VPN access to internal application or authentication procedures and secure communications to Internet accessible sites.

As noted, the invitation can be dispatched by variety of means. Additionally, this dispatch can be subject to a profile-controlled "find-me" function, which may involve presence state, employing a variety of contacts and a variety of modes of communication to reach an invitee party with the invitation.

It is recognized that under some circumstances the requestor of the meeting will contact prospective invitees before involving the reservation system. That is, the person may seek to informally determine whether a meeting is worthwhile before involving the formal scheduling mechanism. When it is decided that a meeting is desired, then the requestor can utilize the scheduling application 101 to reserve resources and obtain particular information, such as conference bridge dial-in number and password, physical location, etc. The conferencing system is useful in this type of scenario because the system provides broadcast of the finalized meeting information and can provide invitation response status, if needed. Upon sending out the invitations, the scheduling application 101 tracks the responses.

The conference requester can elect to be actively notified of the invitation responses through the user interface 301. This notification 403 can similarly be accomplished in a variety of ways through various devices, including PDA, pager, telephone, text message, or e-mail. The frequency of updates or conditions under which the requestor is to be contacted with update information is configurable, as to suit the preferences of the requestor or in accordance with policies set at the enterprise level.

As explained previously, the conference scheduling application 101 processes input criteria 405 from the requester, such as the meeting criteria 407, the time limit 409 for responding to the invitation, and the settings and criteria 411 for notifying the requestor. The application 101 ensures that the criteria is satisfied in setting up the conference, and determines whether to commit or release resources based on the received responses and the available resources (as indicated in the resource reservation information within the database 111).

The conference scheduling application 101 also supports the capability for the requestor to inquire about the meeting confirmation status. For example, the requestor can determine the status by dialing via telephone to a VRU, establishing an instant messaging session with a chat-accessible service platform, using a suitable workstation client application, accessing a site on the web, or corresponding with the system via e-mail.

The conferencing system may also be configured to enforce any meeting confirmation criteria. For meetings involving selected groups of people, such as a department or a committee, an address book function is provided to maintain a corresponding list of attendees—similar to an e-mail distribution list. To facilitate assembling lists of participant information, the contact information for a participant can be obtained from a variety of sources at the user's workstation (e.g., PCs 137, 139). Electronic mail applications commonly provide many features to facilitate addressing of return mail and for accumulating and managing address book lists.

In the context of conferencing, collaboration, scheduling and instant communications it is advantageous to be able to glean contact information from the data items or applications.

A user can retrieve contact information from an identifier from any source, including non-e-mail sources such as electronic business cards. The integrated desktop environment can utilize a clipboard feature (or comparable facility in other user interface environments) to collect or drag-and-drop names, and addresses (or information that could be interpreted and resolved to a contact) among the various applications.

A conference event can be represented as a "packaged" data entity that is accessible by many applications and may exist as a desktop icon and exhibit menu-activated and drag-and-drop activity. This data entity has several important attributes, such as location, actual or planned attendees, scheduled times, actual duration and pointers to supplementary materials or transcripts. As one example of the use of this entity, a user may wish to set up a new conference having many or all of the same attributes as an existing planned or concluded conference. To schedule the new conference, the user may first launch a scheduling interface that provides text entry or other controls for accepting input on conference parameters. Where the interface provides a place to accept attendees, the user may drag and drop the former conference's data object onto the attendee entry area to have the attendee list from the former meeting applied to the new meeting. Where the interface is receptive to time and date information, the data object representing the earlier conference is drag-and-drop manipulated to replicate its time and/or date parameters in the new conference. It should be noted that these actions provide a starting point from which the attendee list, time and date info or other attributes of the new conference may then be edited as needed before submitting the scheduling request to the scheduling application (or engine) 101.

Alternatively, the user may perform a copy-and-paste operation involving the original conference object to create a duplicate as a starting point. The conference data object is used for entering into an active conference by being manipulated onto, for example, an instant communications client or a telephone dialing application. The entry into the conference may also be a menu option associated with the desktop icon of the conference event object.

It is noted that the conference session can involve instant messaging communication, telephony communication, or even launching of a collaborative application. To facilitate such use, the user can be provided a menu option, toolbar icon or other "activatable" user interface element which, in the context of an e-mail being selected or viewed by the user, draws the contact information from the e-mail and launches a communications interface having the same parties identified in preparation for engaging in instant communications with them.

This may also involve recognizing and converting names or e-mail addresses to other forms of addressing such as chat screen names, telephone numbers, Uniform Resource Identifier (URI) aliases, etc. which are suitable for establishing instant communication with the appropriate parties. An alternative is to have a system supporting instant communications, scheduling, conferencing, etc. that accepts e-mail addresses directly and performs a best effort resolution of addresses.

One approach in which a user may arrange a conference involves establishing a chat session with a chat-accessible service. The user may converse with a human assistant or automated assistant via chat or using an instant communications client to request that a conference be scheduled, to request information about a conference or to immediately have a conference session established.

A regular meeting or an impromptu meeting can be readily called by referring to a preset group of attendees. According to one embodiment of the present invention, a meeting request may remain tentative until certain criteria are met. For example, one may specify that the meeting is not confirmed until all of the invitees agree to meet or at least some minimum number or percentage of the invitees agree to meet. In other cases, specific individuals are designated as "required," whereas other attendees are optional. The address book stores such information for specific groups or types of meetings, such as a "quarterly operations review." In other cases, the conference requester specifies these criteria on an ad hoc basis as part of the initial request. A maximum time (i.e., "time out") for invitation responses can be set.

The conferencing system supports various interfaces whereby the requestor can be notified of which and/or how many invitees have responded and whether the conference has been successfully reserved based on the criteria set forth. The interfaces for receiving this "status of the conference reservation" can include e-mail, phone, text messaging, etc. The requestor is also provided with a list of names of parties that have responded and/or a list of those who have not responded. The frequency of updates or conditions under which the requestor is to be notified of the status of the meeting is optionally configurable by the requester.

It is noted that, at times, a conferencing collaboration or instant communications session is desired with at least one member of a given group (or category of invitees), but without requiring any specific member. For example, the invitation can be directed to a pool of employees within a particular department, wherein any one of the employees possesses the appropriate authority to take action (e.g., respond to requests or initiate work orders).

The various described procedures and mechanisms for setting up a conference can also be applied to reschedule conferences should the need arise.

According to one embodiment of the present invention, the conferencing scheduling application 101 provides a conferencing "wizard," which guides the user through screens and menus for setting up a conference. The wizard can prompt for information about the meeting and the participants. Meeting information can include parameters enumerated in Table 2 (below), and participant information can be those listed in Table 3. The complement of options provided to the user by the conferencing wizard may be affected by such factors as an assessment of resources that will be available during the desired meeting time, the set of features that the user is authorized to employ for conference scheduling, capabilities and schedule availability of invitees as may be determined in real time by checking calendar information or presence information, or consulting of databases or directories or applications (organizational chart, project tracking application, etc.) which determine a set of invitees corresponding to a particular group or class of invitees.

TABLE 2

Participants for the meeting
Type of meeting, in which one, many, or all of the following can be selected:
   1. Teleconferencing
   2. Bridge call
   3. Physical location
Required participants
Minimum number of required participants
Meeting reoccurrence TABLE 2-continued Services required:
   1. Security mechanisms
   2. Audio details
   3. Video details
   4. White board
   5. Minutes/transcription service
Billing information

TABLE 3

Contact information:
   1. Pager information
   2. Cell phone
   3. Home phone
   4. Work phone
   5. Emergency phone
   6. Email information
   7. Which mode to use in case of emergency notification
   8. Last known availability
Alternate contact - a person that can act (e.g., authorized to attend and make decisions) on behalf of the original contact
Mode for receiving status on confirming attendance
Mode for receiving status on confirming acknowledgement The conference invitation (or session request) can be configured such that, when any one member of a group responds affirmatively, the conference is confirmed or the communications are initiated. Any concurrent invitations to other members of the group who were not the first to respond are optionally withdrawn, or those members can simply be copied on the finalization details of the conference. The other members of the group are informed of which group member responded on behalf of the group or is indeed handling the matter.

Returning to the example of FIG. 3, when a user receives an invitation, the user can be presented with a meeting reminder in a calendar application (e.g., Microsoft Outlook calendar application or a meeting invitation similar to Windows Messenger, Sametime or AOL IM) that allows the recipient to click one button for entry into the conference, either through voice, video, and/or data collaboration (e.g., file sharing, application sharing, electronic white board, etc.) In this manner, the participation process is automated, such that the recipient need not perform any process manually.

In the response process, a file containing a description and identification of the conference can be exchanged, whereby the file can be input into and interpreted by a conference application within a host, workstation, or device of the participant. The file can be specified as a particular file type (or extension) that is readily recognized at the device, thereby causing a conferencing application to be launched for handling the file to enter the conference with minimal additional input from the user.

The workstation can provide for entry into conference in a largely automatic manner without the user having to locate and act upon the invitation to enter into a conference. Entry into a conference is automatically triggered as a recurring event, when a conference becomes active or when the scheduled start time of the conference arrives. Another type of automatic conference entry may occur when an immediate conference invitation is received. The user may configure the workstation or system profile information such that, when a conference invitation from a certain party or concerning a certain subject arrives, the user is automatically entered into the conference including any parallel sessions or applications required for participation.

Alternatively, a user can select or activate this type of feature associated with an invitation whereupon the user is presented with a dialog box to verify that the user indeed wants to join the conference at that time. The option to enter the meeting immediately is conditionally presented to the user based upon whether the current time is within the published time frame of the conference or is responsive to sensing whether the conference is indeed underway as will be described later herein. The dialog box may provide an opportunity to authenticate the user attempting to enter the conference.

According to one embodiment of the present invention, the information necessary to identify the conference and any required parameters for successfully joining the conference are embedded in or referenced by the invitations. When the user activates this feature in the invitation, the user is automatically joined to the conference if the conference is underway. That is, the user need not perform any additional steps to join the conference, such as invoking a separate application and then specifying what conference is to be joined.

Data pertaining to the conference, such as presentation handouts or e-mails, may also automatically be presented to the user upon entering the conference or as an option upon activating or selecting a feature embedded in the invitation.

FIG. 5 is a diagram of a graphical user interface (GUI) for displaying of an invitation response status, in accordance with an embodiment of the present invention. As mentioned, it is useful in many circumstances for a conference requestor who is arranging a meeting to be kept informed of whether invitees have indeed received and acknowledged invitations. Upon disseminating the invitations, the conference scheduling application 101 (or group of scheduling applications) provides feedback to the requester, as invitees respond in real-time. By way of example, an Invitation Response Status screen 500 includes an Invitee field 501 specifying the list of invitees for the particular conference. The status fields (or indicators) include a Received field 503 indicating whether the invitation has been received by the participant. An Accepted field 505 specifies whether the participant has accepted the invitation to join the conference. A Declined field 507 is also displayed to indicate that the invitee has declined the conference invitation.

Although the screen 500 is shown as appearing in a user interface as list or table of invitee names (or other identifiers) along with one or more indicators representing whether each entry has received, acknowledged, accepted or declined the invitation, those of ordinary skill in the art will recognize that there are many possible configurations for presenting this type of information. For example, the status fields 503, 505, 507 can be represented by changes in the appearance (e.g., color, font style) of the invitee's name or changes in the graphical icon associated with the name. Alternatively, the list can selectively indicate only those parties who have or have not responded in some manner. Also, the screen 500 can display an array of images representing the invitees. The images may similarly change in appearance or placement so as to convey the acknowledgment/acceptance status of invitees. Textual identifiers and graphical representations for invitees are used as alternatives or in combination subject to implementation, display device capabilities, and to the preferences of the user viewing the interface. The images can also change to represent the availability of the invitees based on the invitees' electronic calendars.

The user interface for displaying the invitation response status for a given event can be provided via an application on a requestor's workstation, corporate application or web-service, with due consideration for security measures. That is, the screen 500 can be displayed to the conference requester through a web browser application or other equivalent client application.

The response status information is synchronized with the respective participants' electronic calendar (e.g., 137c, 139b). For instance, an acknowledged and accepted invitation is placed on the participant's calendar. The real-time display of acknowledgement status may optionally be made available to other attendees so they can be notified whether a meeting is indeed materializing. In various embodiments of the present invention, responses are received by a functional e-mail account, Real-Time Communications (RTC) server, web service application, or requestor's workstation with application plug-ins or helper applications.

With the graphical display of the conference status information, the requestor is better informed in the instances where certain parties remain unaware of the invitation or cannot attend the meeting. The requestor can then decide to postpone or cancel a meeting based upon this feedback, thereby reducing the probability of "no shows" at the meeting. By automatically informing the requestor in this manner, the conference scheduling process is advantageously made more efficient.

Figure 6:
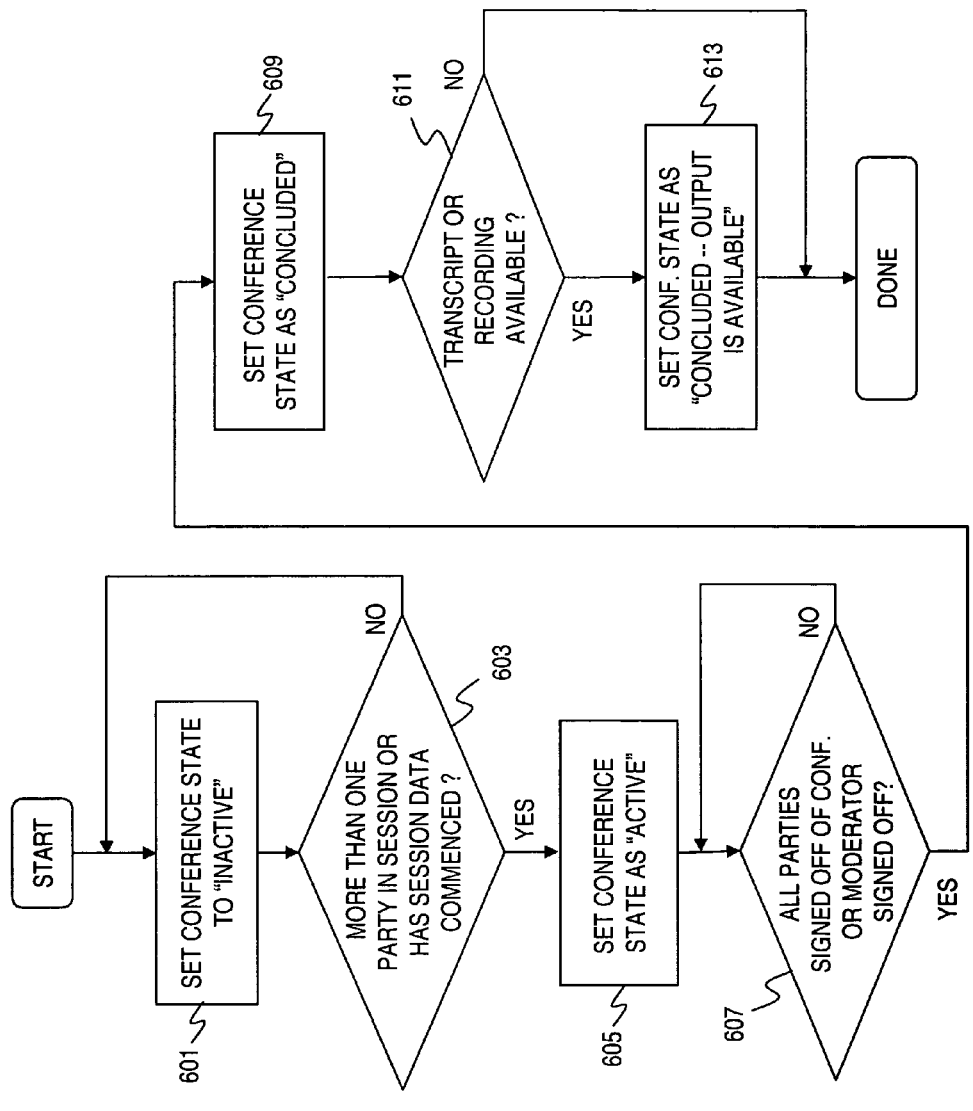
FIG. 6 is a flowchart of a process for determining the state of the conference, in accordance with an embodiment of the present invention.

FIG. 6 is a flowchart of a process for determining the state of the conference, in accordance with an embodiment of the present invention. Because the conferencing system, collaborative application or communications system, is involved in the conduct of a conference session, the service provider can determine when a session is either active or has concluded. In step 601, the conference scheduling application 101 initializes the conference state to be "Inactive." If one or more party joins the session (or session data has commenced), per step 603, then the conference state is set as "Active" (step 605). Next, the conference scheduling application 101, in conjunction with the telephone conference bridge 103 and/or the IP conference bridge 105, determines whether the conference has concluded, for example, based on either all the parties signing off the conference or the moderator conducting the conference has signed off, as in step 607. If either of the condition has occurred, then the conference state is set to "Concluded," per step 609.

As described earlier, the conferencing system supports recording of the conference. In step 611, the conference scheduling application 101 determines whether the conference has been recorded and is available, either through a transcript (e.g., meeting minutes) or recording. If such information is available, the conference state can be set, as in step 613, to reflect this option —i.e., "Concluded—Output is Available" state.

Therefore, a user who is not a participant in a given meeting can nevertheless be notified of the termination of the meeting. This information is useful in that the user may wish to know the schedule and location of a participant of the conference. The user can invoke a feature within the conferencing system to dispatch communications, such as a text page or an instant messaging communication, when the system detects the conclusion of the session or the conclusion of the particular attendee's involvement in the session.

Effectively, the presence state is known to the conferencing system. This enables checking by users or by applications of whether a meeting or session is indeed active at any given time. This awareness can be used, for example, to signal would-be participants that a scheduled meeting was terminated early, saving them time and effort to log into a meeting only to find that it has already concluded. This capability can result in tremendous efficiency in time management, particularly to those users who are extremely busy.

Figure 7:
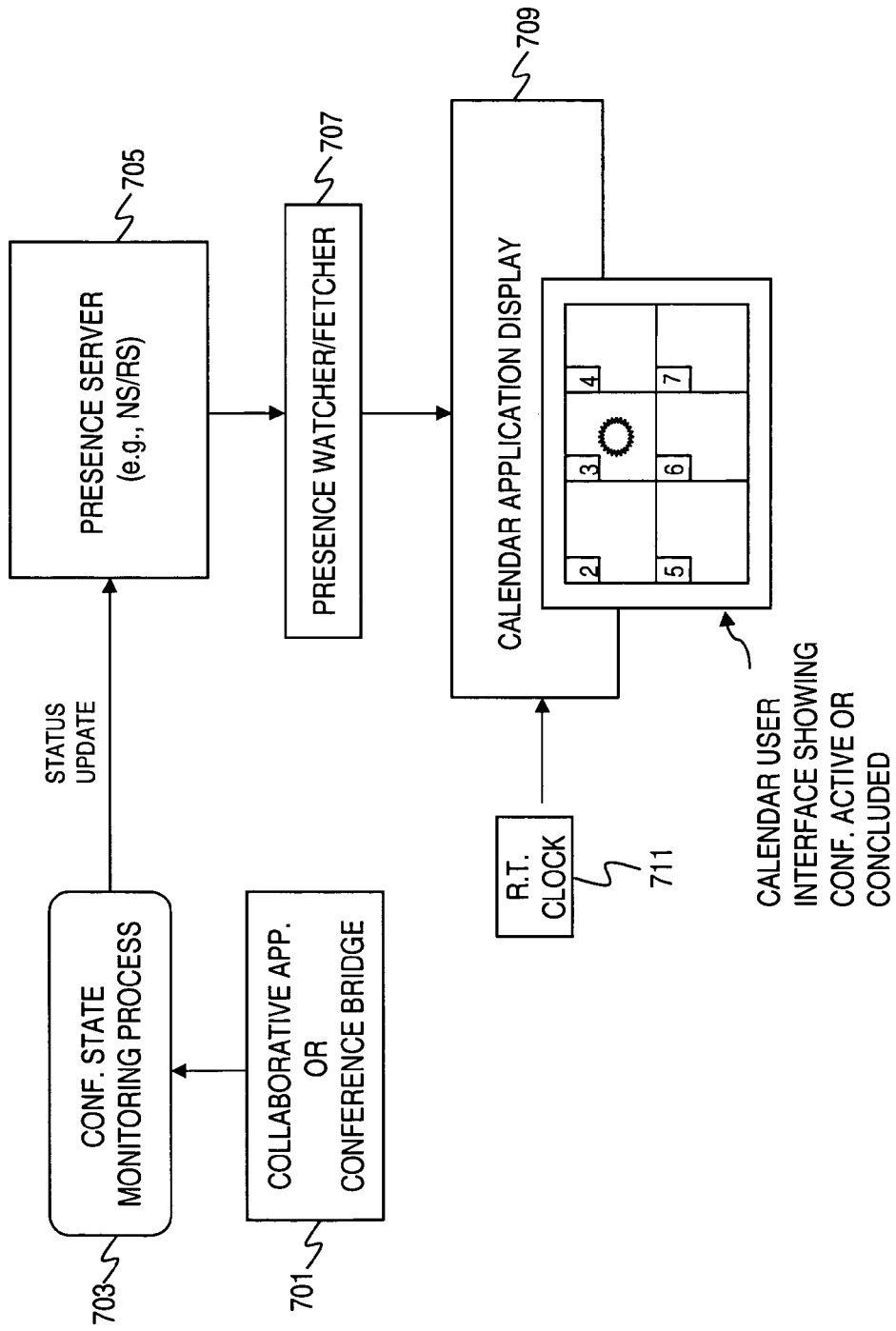
FIG. 7 is a diagram of an exemplary calendar user interface showing conference status information, according to an embodiment of the present invention.

FIG. 7 is a diagram of an exemplary calendar user interface showing conference status information, according to an embodiment of the present invention. The ability to sense the current status of a conference or collaborative communication may also be applied to how the scheduled event is depicted for a user, such as in the user interface of a calendar application. The calendar application graphically displays the event superimposed upon a daily, weekly or monthly calendar view. This information is updated as the meeting transpires to visually reflect the current state of the meeting.

This integration of the conference status information with the calendaring function is diagrammatically illustrated in FIG. 7. A collaborative application or conference bridge 701 (e.g., bridges 103, 105) provides input to a conference state monitoring process 703. In an exemplary embodiment, this process is executed as part of the conference scheduling application 101. The conference state monitoring process 703 provides status update information to a presence server 705, which stores conference presence state information. The presence server 705, in turn, provides the information to a presence watcher/fetcher process 707, which interfaces with a calendar application 709.

The calendar application 709 operates in a real-time to update the conference presence state, per the real-time clock 711. Accordingly, the calendar application 709 can graphically show, for example, that the meeting is in progress, is running overtime or has concluded, with the actual start and stop times depicted on the interface. The appearance of the calendar application 709 can be manipulated to indicate when the meeting is actively in session and when the user is an invitee. The appearance may also communicate whether attendance of the particular user is imperative or optional. The size occupied by the indication (e.g., a bar indicator) superimposed in the calendar or day planner interface is indicative of actual start and stop times or overall duration. Hence, the appearance of the calendar can be configured to convey whether the meeting is planned, currently active, or concluded or canceled, as well as how many people have been invited, are currently attending or did attend the subject meeting.

Furthermore, various actions can be invoked by selecting icons, images, or text within the calendar associated with the particular meeting time slot, as depicted on the user interface. For example, by clicking within the meeting slot, the meeting transcript (chat) retrieval of recording or retrieval of presentations/documents used or contributed during the meeting. Other actions can be triggered, such as copying the attendee list to the system clipboard.

Another action that may occur upon the user clicking or selecting the graphical representation of the meeting is to immediately connect the user to the conference, including opening any additional interfaces and establishing sessions as needed. This capability facilitates the use of conferencing invitations and personal calendar interfaces. The graphical representation and its behavior may also be presented to the user as a standalone icon on the user's desktop.

As described above, in the context of a conferencing event, the notion of an event having a presence state relates to the ability to detect and indicate to a participant whether a given conference is available to engage in a communications session at a given moment.

Figure 8:
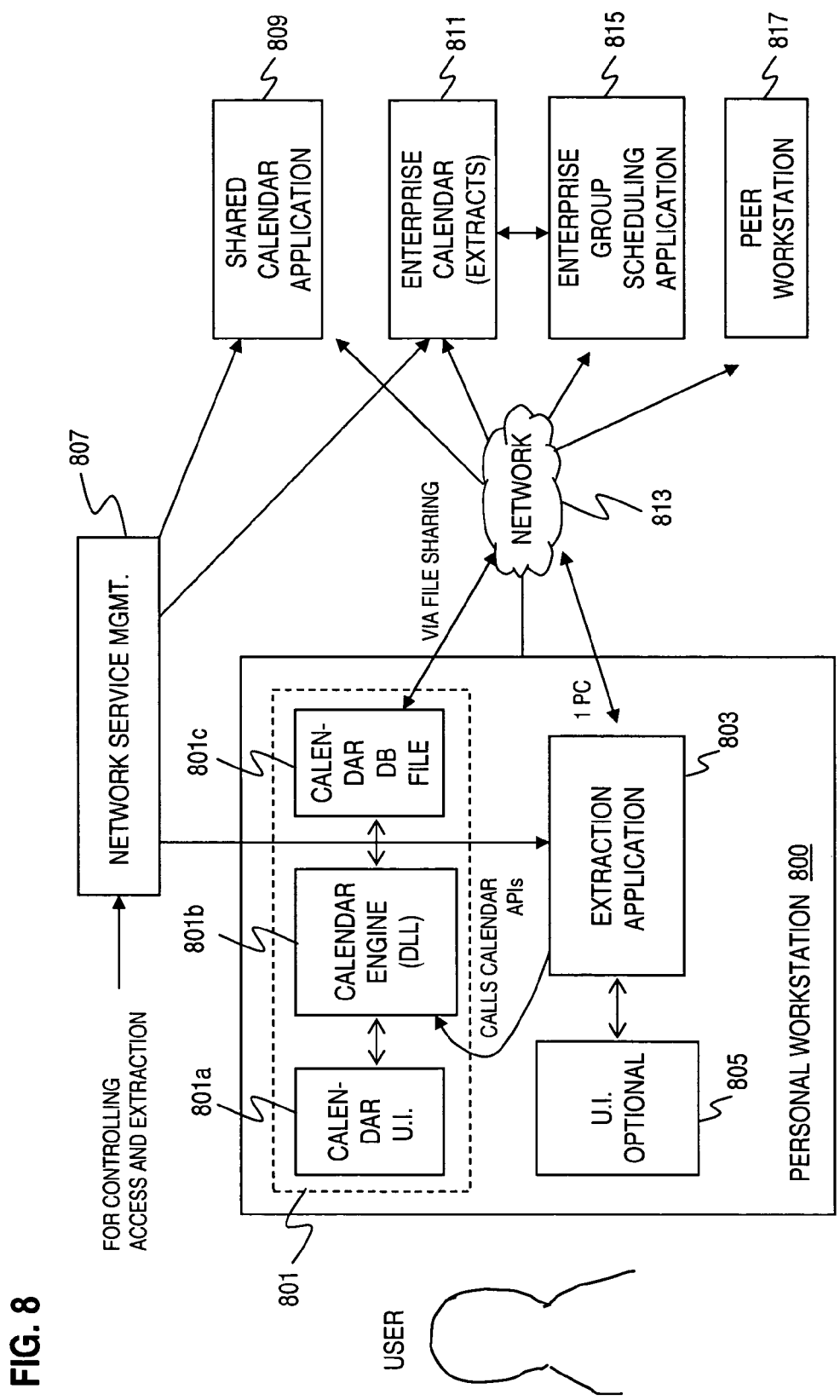
FIG. 8 is a diagram of a workstation capable of accessing personal scheduling information to perform group scheduling, according to an embodiment of the present invention.

FIG. 8 is a diagram of a workstation capable of accessing personal scheduling information to perform group scheduling, according to an embodiment of the present invention. The conference scheduling process may take into account not only conferencing resources, but also availability of the participants based on their individual schedules. A preferred range of times are expressed by the requester, and the scheduling process may return a list of candidate times from which the requestor may select. Availability of physical resources, if necessary, are considered as well. Checking of availability is based on open time slots on the user's calendar resident within the user's workstation. The calendar application, in an exemplary embodiment, can be maintained or synchronized with a remote enterprise or web-based calendar.

As seen in FIG. 8, a workstation 800 (e.g., PCs 137 and 139 of FIG. 1) executes a calendar application 801, which includes a calendar user interface 801, a calendar engine 803, and a calendar database file 801c. The calendar application 801 interacts with an extraction application 803, which calls the calendar Application Programming Interfaces (APIs) of the calendar engine 803. The extraction application 803 can be accessed through an optional user interface 805.

The extraction application 803 communicates with a network service management system 807, which exchanges information with a shared calendar application 809 and, by way of example, a remote enterprise calendar 811. The workstation 800 has connectivity to a data network (e.g., enterprise network) 813 for communicating with the enterprise group scheduling application 815 as well as a peer workstation 817.

For the purposes of explanation, the calendar application 801 includes a personal calendar and time management functions (e.g., Microsoft Outlook). It is contemplated that selected information from the user's calendar are extracted and communicated to the scheduling application 815 or communicated among other workstations (e.g., workstation 817) in a peer-to-peer fashion. For example, unreserved times in the user's normal work schedule might be made known to others so that they may more effectively choose meeting or conferencing times that avoid scheduling conflicts.

The extraction application 803 extracts personal calendar information resident on the user's workstation 800 and reports the extracted information to, for example, the enterprise calendar 811 or scheduling application 815. The extraction application 803, according to various embodiments, can range from a minimal process operating invisibly on the workstation 800 to a complete standalone application providing a user interface by which the user can configure its operation, such as controlling what information are extracted and presented to others. Alternatively, the extracting process may operate elsewhere on another host, wherein access to this type of information at the workstation 800 is through file sharing or inter-process communication.

As shown, the users' calendars can be maintained entirely in a central location, such as the enterprise-wide calendar 811 and the group scheduling application 815. The information is readily accessible to a scheduling function, and the parties can access their calendars through web browsers or other clients. The calendar information that is extracted, remotely maintained, and made available for scheduling processing or review by others are all inclusive or are selectively restricted. For example, only unreserved or "open" (or available) time slots are extracted and provided to the scheduling application 815 (which can be deployed as a scheduling server). In other cases, a user's entire schedule is remotely recorded, whereby only free time slots are made visible to the scheduling application 815 or to other parties. The ability of other users to access this information, in an exemplary embodiment, depends on their access privileges, delegation of authority or their role within an organization. The access control parameters are configurable at an enterprise level according to policy and/or by individuals associated with the calendar information.

In another embodiment of the present invention, the users' schedules are implemented as a server that is accessible by users from many enterprises or other parties outside of the enterprise. This type of server is depicted in FIG. 1 as calendar sharing application 107, which may or may not be hosted and controlled by the network service provider. It should be noted that the calendar sharing application 107 enables sharing of availability information among users from different organizations in addition to users within the same organization. This capability is useful when two different organizations need to closely collaborate; for example, a team of designers from one company works with a group of manufacturing engineers from another company in a joint venture. For the benefit of the collaborative effort wherein the users from different companies will function temporarily as a single, cohesive team, the scheduling application 815 supports scheduling of meetings or conferences with knowledge of the time slots available for the team members.

With due consideration for security and privacy issues, the calendar sharing application 107 may serve as a repository for limited personal schedule information to be shared among companies. This avoids the companies having to expose some of their network and computing infrastructure to one another. In this regard, the calendar sharing application 107 complements the common meeting point role served by the collaborative applications 109.

The manner and degree to which personal or resource schedule information is provided to the calendar-sharing application and the control of who may access such information are administered by selected users in the enterprise, or by a service provider or other entity having control of the application. For example, limited sharing arrangements mutually agreed upon by collaborating organizations are configured, for example, through service management application 115.

Figure 9:
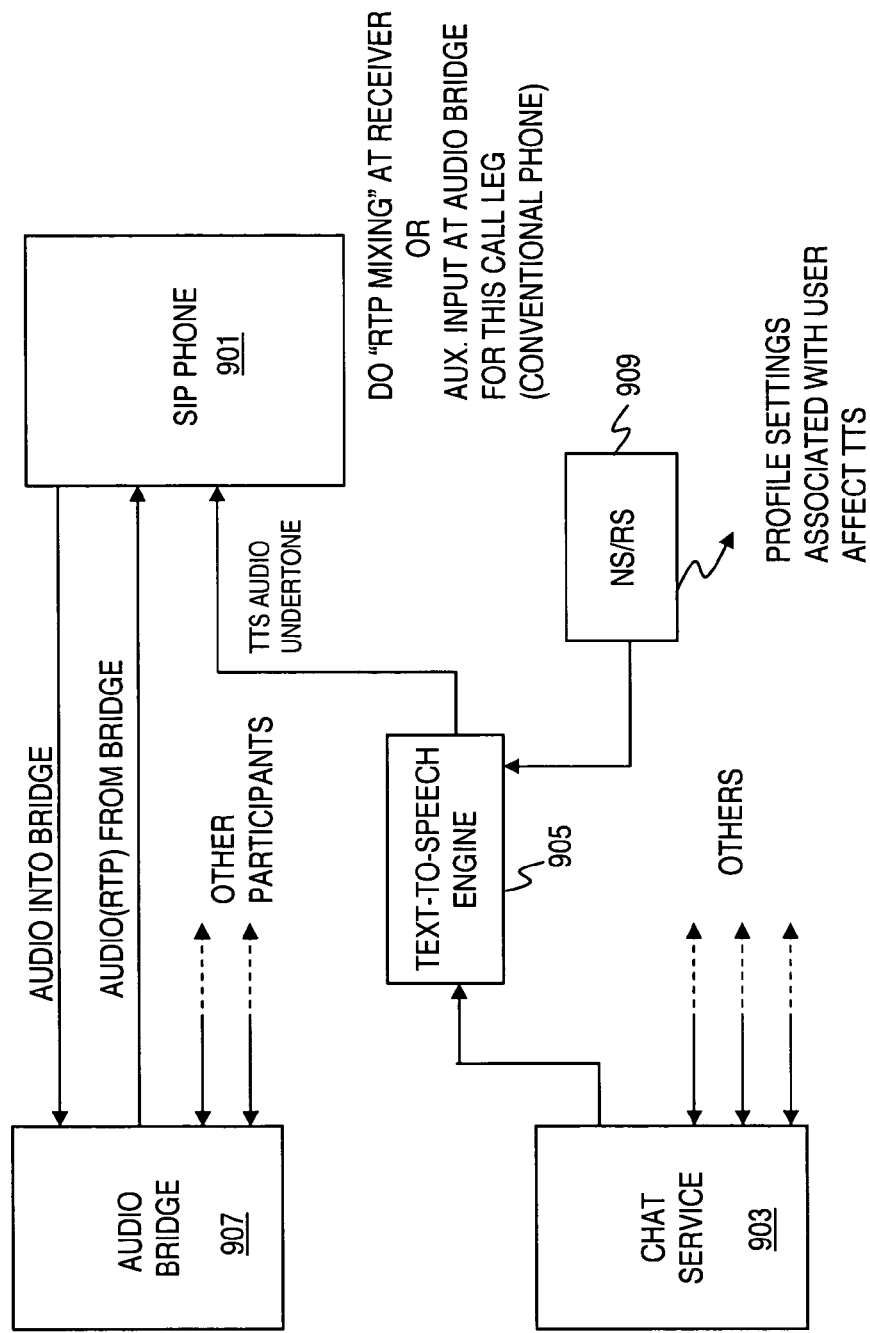
FIG. 9 is a diagram of a telephone session supporting media crossover of a conference session, according to an embodiment of the present invention.

FIG. 9 is a diagram of a telephone session supporting media crossover, according to an embodiment of the present invention. The flexibility of the conferencing system of FIG. 1 extends to the various media that can be supported during a conference session. In some cases, a subset of the participants may access a collaborative conference session without being able to participate in the collaboration features. This constraint can be intentional or can stem from the limitations of the capabilities of the devices participating in the conference or the connection bandwidth supporting the session. In such cases, the conferencing system provides media crossover features.

Media crossover may involve, for example, having audio converted to/from text messaging, having graphical text converted to text messaging or audio, and having snapshots of images sent via facsimile transmission. The collaborative applications 109 are utilized to accommodate differences between presentation media and participant reception capabilities. This technique can be applied, as seen in FIG. 9, to a participant who is using only a telephone (e.g., a SIP phone) 901, whereas other participants are engaging on chat or viewing textual information via a chat server 901. While monitoring the conference by listening through the telephone 901, the participant can receive a low-volume audio signal from a text-to-speech (TTS) converter 905. By the proper selection of speech characteristics for the speech rendering, the text reading undertone can be readily distinguished from live conference speeches from the other participants connected to the audio bridge 907 (e.g., telephone conference bridge 103). The TTS converter 905 can be controlled by user profile settings supplied by a NS/RS server 909. For a SIP call, the "RTP mixing" can be performed at the SIP phone 901; alternatively, if the call is a conventional telephony call (i.e., circuit switched call), then the TTS audio undertone can be supplied to the audio bridge 907.

As another example of media crossover, a user can participate in the conference session by video through an instant communications client; however, the user may not have full access to a collaborative application by which to participate and view the shared whiteboard or workspace. In accordance with an embodiment of the present invention, the participant who has a video connection may receive the whiteboard image as a converted video image. Under this scenario, the participant's video feed can switch between the presenter and a video rendering of the whiteboard space. This switching may occur either automatically, under the control of the presenter, or as requested by the participant.

Figure 10:
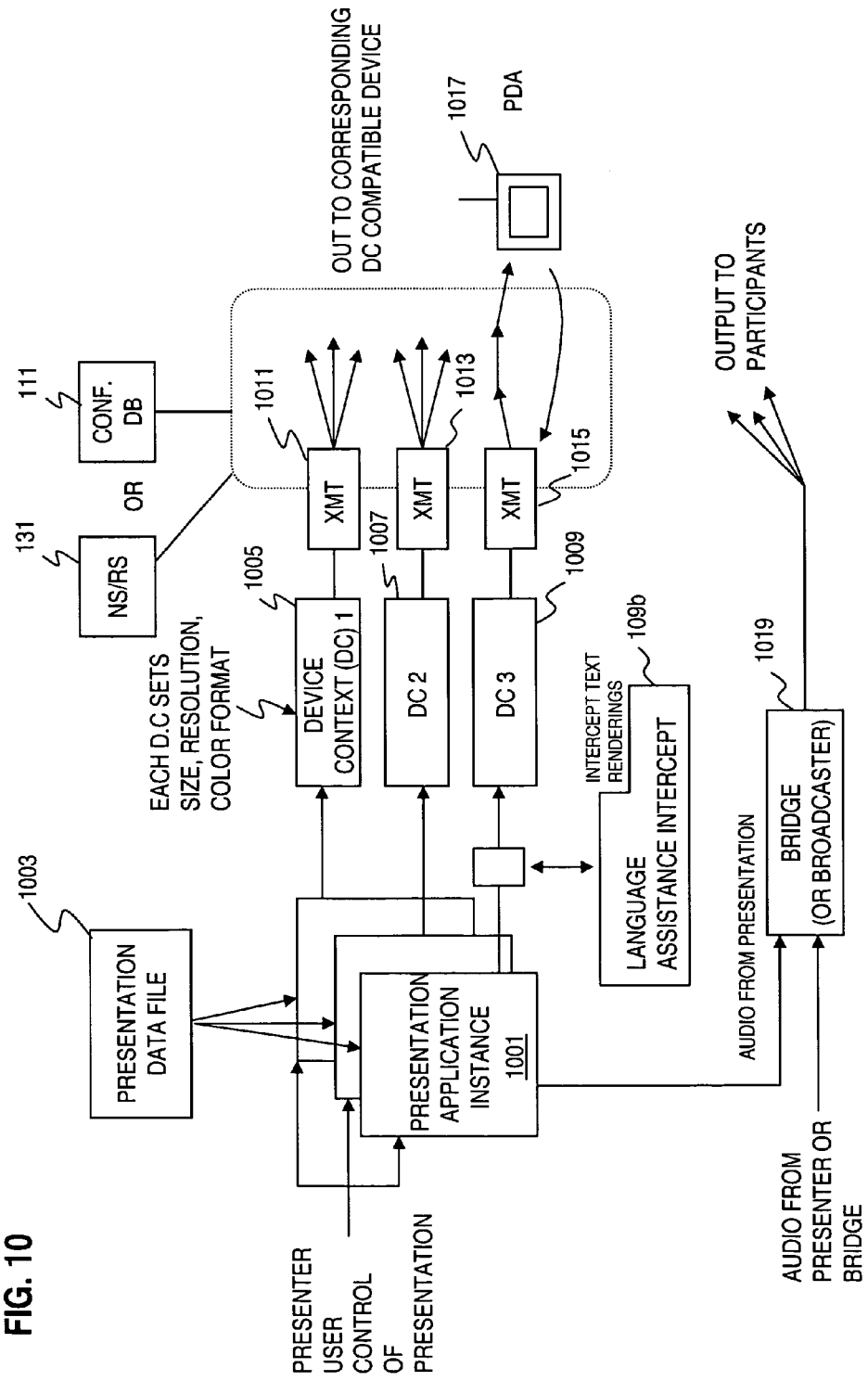
FIG. 10 is a diagram of conferencing system components for providing customized presentation output for a variety of devices, according to an embodiment of the present invention.

FIG. 10 is a diagram of conferencing system components for providing customized presentation output for a variety of devices, according to an embodiment of the present invention. The conferencing system of FIG. 1 has the capability to adapt presentation materials of a certain format (e.g., Microsoft Powerpoint, Adobe PDF files, etc.) to match the capabilities of the devices and to reflect any communications constraints (e.g., bandwidth) for delivery of the presentations to the devices.

As shown, multiple presentation application instances 1001 are executed, wherein each of the respective instances loads a presentation file 1003 and transmits the file 1003 to corresponding device context modules 1005, 1007, 1009. The instances 1001, in an exemplary embodiment, are launched from the presentation sharing application 109a (of FIG. 1). Although shown as separate components, the presentation application instances 1001 and the device context modules 1005, 1007, 1009 reside on a common server. In fact, the collaborative applications 109 can be executed on such a common server.

The presentation sharing application 109a (shown in FIG. 1) supports the ability to show a view of the presentation file 1003 to users who do not have the presentation application on their computers or devices, but instead have, for example, a web browser application. This approach advantageously minimizes the requirement of the end devices to have additional applications and avoids having to disseminate copies of the presentation before or during the conference. Additionally, the approach ensures that proprietary presentations are not stored or distributed without the consent of the presenter.

In the course of providing slideshow presentations and whiteboarding display to a variety of participants, the server customizes output in a variety of ways, including language translation of text passages within presentations and messaging communications. Also, the output of graphical information to participants is differentiated at the server. The presentation (or collaboration) server tailors the output format to suit various types of end user devices, associated connection speeds, and user preferences. Specifically, each of the device context modules 1005, 1007, 1009 converts the file 1003 to accommodate the end device that is to display the presentation; the conversion can involve altering the size, resolution, color format, etc. of the presentation file 1003. For example, a lower resolution view of a presentation is suitable for using a PDA 1017. Rather than sending a high-resolution image to a small display, the resolution is reduced and efficiently transmitted a lower resolution view. This avoids burdening the end user device with scaling down or re-sampling the image "on the fly." Having the server perform the display adaptation is especially practical if the server is already occupied in playing a presentation into a virtual display space as in the presentation sharing application 109a (FIG. 1).

Where a presentation includes animation or transitions between slides, the server is able to render these effects, whereby each receiving device will receive a best effort rendering limited primarily by the bandwidth or refresh rate afforded by the connection. As a further advantage, having the server perform re-sampling, magnification, color conversion, scrolling, rotating, panning and other graphical tasks ensures that the handling of the image is not dependent upon specific applications being present and properly configured on the small device. In many cases, generic web browsers are used as a "common denominator" client supported by a wide variety of receiving devices.

Rendering attributes are profile-associated for the user or device. These attributes can be changed dynamically by commands sent from the device to the server during the communications session. In this example, these commands are carried in the form of so-called SIP "re-INVITE" messages or in Session Description Protocol (SDP) content sent therewith.

The device context modules 1005, 1007, 1009 communicate with corresponding transmitters (XMTs) 1011, 1013, 1015 to the hosts or devices. In this example, the PDA 1017 can view the presentation file 1003, which is adapted for the processing power and storage capability of the PDA 1017. Additionally, the presentation file 1003 can be processed by the language assistance intercept 109b such that esoteric terminologies, acronyms, and abbreviations can be explained or defined.

If the presentation file 1003 includes audio, the presentation sharing application 109b may provide play-out and feed audio into a conference bridge or as a RTP stream to an instant communications client. Consequently, even non-PC connected users or users accessing the conference by phone will receive the sound program from the presentation without manual intervention from the conference presenter, who is likely remote from the conferencing application server and has to provide presentation audio feed through a separate connection into a bridge or conferencing application. Thus, the audio associated with the presentation is fed to a bridge (or broadcaster) 1019, which outputs to the conference participants.

Figure 11:
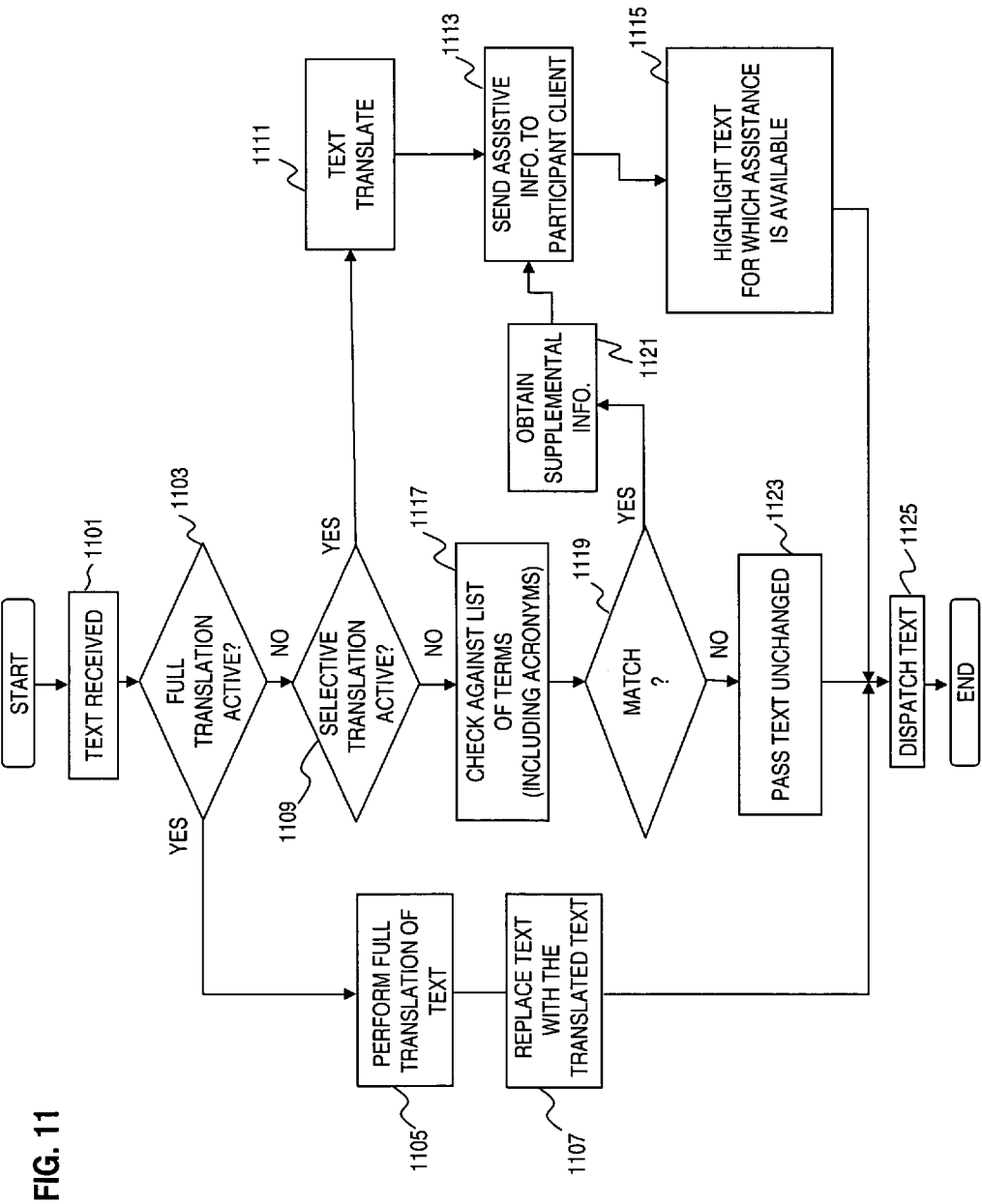
FIG. 11 is a flowchart of a process for providing language assistance in a conference session, according to an embodiment of the present invention.

FIG. 11 is a flowchart of a process for providing language assistance in a conference session, according to an embodiment of the present invention. As explained previously, the language assistance application 109b provides language translation of text passages within presentations and messaging communications. In the case where participants in a conference or messaging session utilize different languages or dialects, the language assistance application 109b may intervene or be invoked to perform real-time translation. For example, during a text messaging session among people who converse in English and other participants who converse solely or mainly in French, translation are performed such that a French participant sees all of the conversation in French and an English participant sees all of the conversation in English. In addition to such translation, the language assistance application 109b can provide assistive or supplemental information to enhance the understanding of terms or acronyms. The operation of the application 109b is as follows.

In step 1101, textual information (e.g., text string) is received. Next, it is determined whether the full translation feature is active, per step 1103. If this feature is activated, then full translation is performed on the received text and the text string is replaced with the translated text, as in steps 1105 and 1107.

When a participant is moderately fluent in a given language, language assistance offers additional information, such as a brief definition, for selected words that are less frequently encountered or likely to be confusing to the participant. The supplemental information can be presented automatically by the application or elicited by the participant by, for example, clicking on the problematic word or phrase as it appears in the text. The availability of this supplemental information is represented by highlighting, bolding underlining or italicizing of the text for which "help" is available.

If the selective translation feature is active, as determined in step 1109, then the text is translated in part as assistive (or supplemental) information without replacement of the text, per step 1111. This assistive information is then sent to the participant client, as in step 1113. The received text is highlighted in some fashion, as in step 1115, to indicate to the user that supplemental information is available.

Returning to step 1109, if the selective translation feature is not active, then the language assistance application 109b defaults to "translating" acronyms or providing definitions. This mode of operation is extended to conferencing that does not necessarily entail differing languages but instead involves specialized terminology, such as technical, legal or medical terms. The received text is compared with a predetermined list of terms and their definitions, and/or a list of acronyms, per step 1117. Even in the context where parties are very familiar with a topic, it is desirable to ensure a common understanding of certain terminology. In some cases, operational definitions are set forth by a presenter to facilitate clear communications. As one advantage of the presently taught mode of operation, the availability of definitions in this manner may avoid participants having to interrupt the presenter to ask for clarification, especially in cases where a participant is late and misses the beginning of a conference when such operational definitions may have been introduced. Even in the case where a participant receives the initial presentation of a definition, the participant may want to recall the information later during the presentation.

These lists can be third-party-provided definitions, such as known dictionaries or technical dictionaries, or terminologies and definitions supplied by the user organization. That is, the language assistance application 109b can incorporate special data repositories offered by third-party suppliers. For example, depending on subject matter, it is useful to recognize key words, phrases or acronyms and to insert information drawn from resources such as Newton's Telecom Dictionary, Black's Law Dictionary or a medical encyclopedia. Such assistive or supplemental information is useful, for example, in the case where different engineering teams across the same organization use different terms for the same meaning. In step 1119, it is determined whether the received text matches any terms or acronyms on the list. If so, the term is retrieved as supplemental information for the received text, per step 1121. If no match is found, the received text is passed unchanged, as in step 1123.

In step 1125, the text, including any translated text or assistive information, is dispatched.

The language assistance application 109b advantageously improves the conference sessions by monitoring communications, such as text messaging, for the presence of passages that need to be translated or augmented with assistive or supplemental information. It is contemplated that assistive information provided in response to a passage in the presentation or conversation conference may include many types of helpful information, including links or pointers to other sources of further information such as Uniform Resource Locators (URLs) of the type commonly used to indicate web sites.

It is contemplated that language assistance, such as translation of text, may occur within presented materials even without the presenter having to foresee this possibility and make special accommodations within the materials. For example, where presentation slides (e.g., MS Powerpoint) are "played" into a presentation space, it is possible to recognize text passages, or calls to text rendering functions in the application or operating system, and to perform translation of text or augmentation with added information as mentioned above. With this approach, the invocation and behavior of these features are more subject to the preferences of the receiving party.

Figure 12:
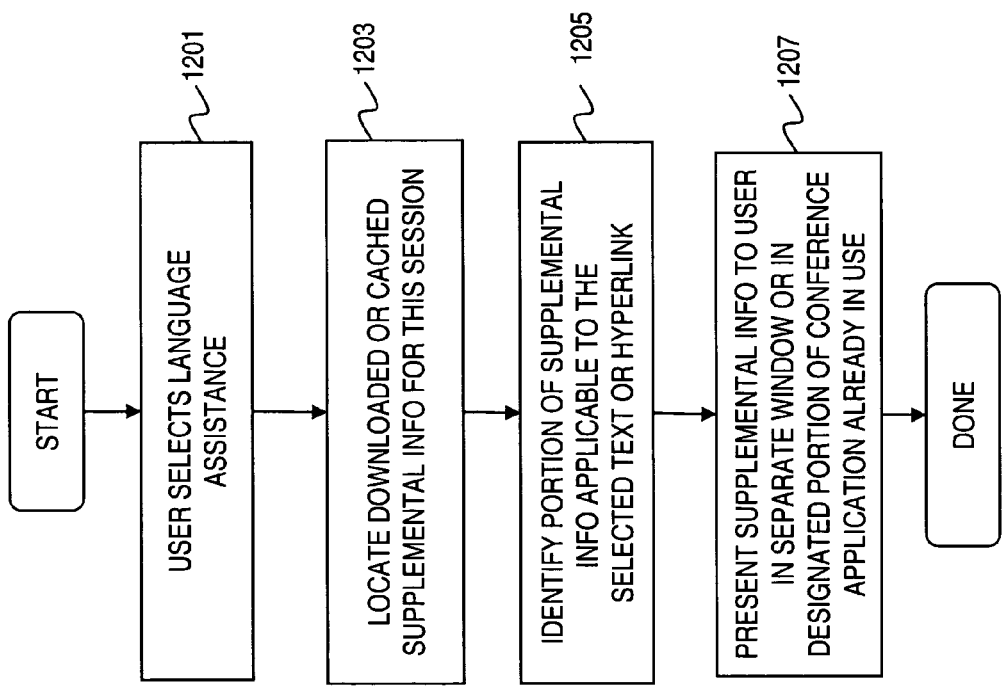
FIG. 12 is a flowchart of a process for activating language assistance supplemental information, according to an embodiment of the present invention.

FIG. 12 is a flowchart of a process for activating language assistance supplemental information, according to an embodiment of the present invention. When the participant activates the highlighted word or phrase (per step 1201), the supplemental information for the particular conference session is downloaded or cached, as in step 1203. The application 109b identifies the portion of the supplemental information applicable to the selected text (or hyperlink), per step 1205. Thereafter, the supplemental information is presented in, for example, an instant messaging client or in a separate window where it can persist until the user dismisses it (step 1207).

The processes of FIGS. 11 and 12 can be offered by a network service provider as a service, whereby the users pay for each instance of use or in proportion to volume of use. The users can also or alternatively be billed for having the feature available on demand.

In addition to the language assistance service, the conferencing system supports recording of the conference sessions, as next described.

Figure 13:
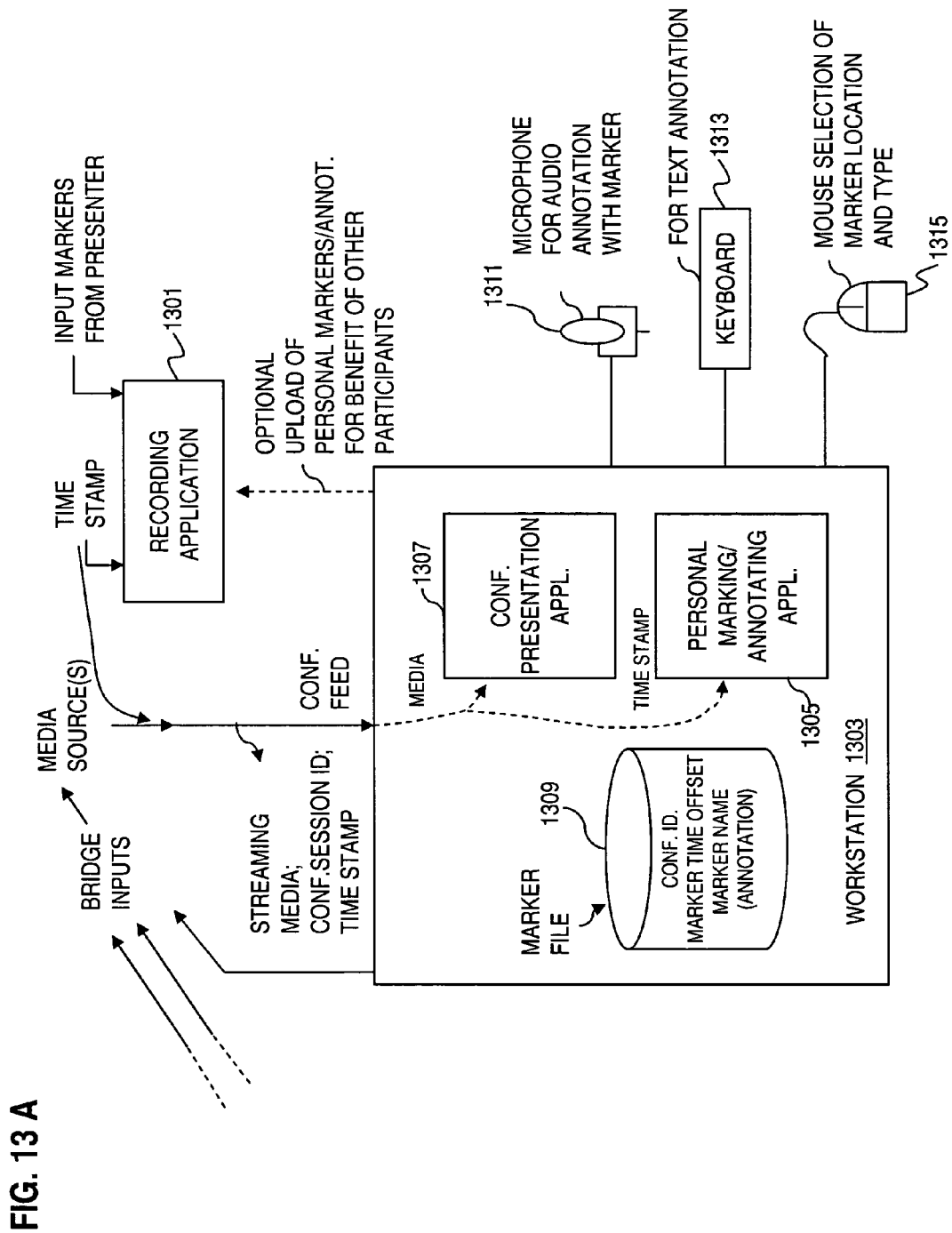
FIGS. 13A and 13B are diagrams of processes for recording and playback, respectively, of conference media, according to an embodiment of the present invention.
Figure 13:
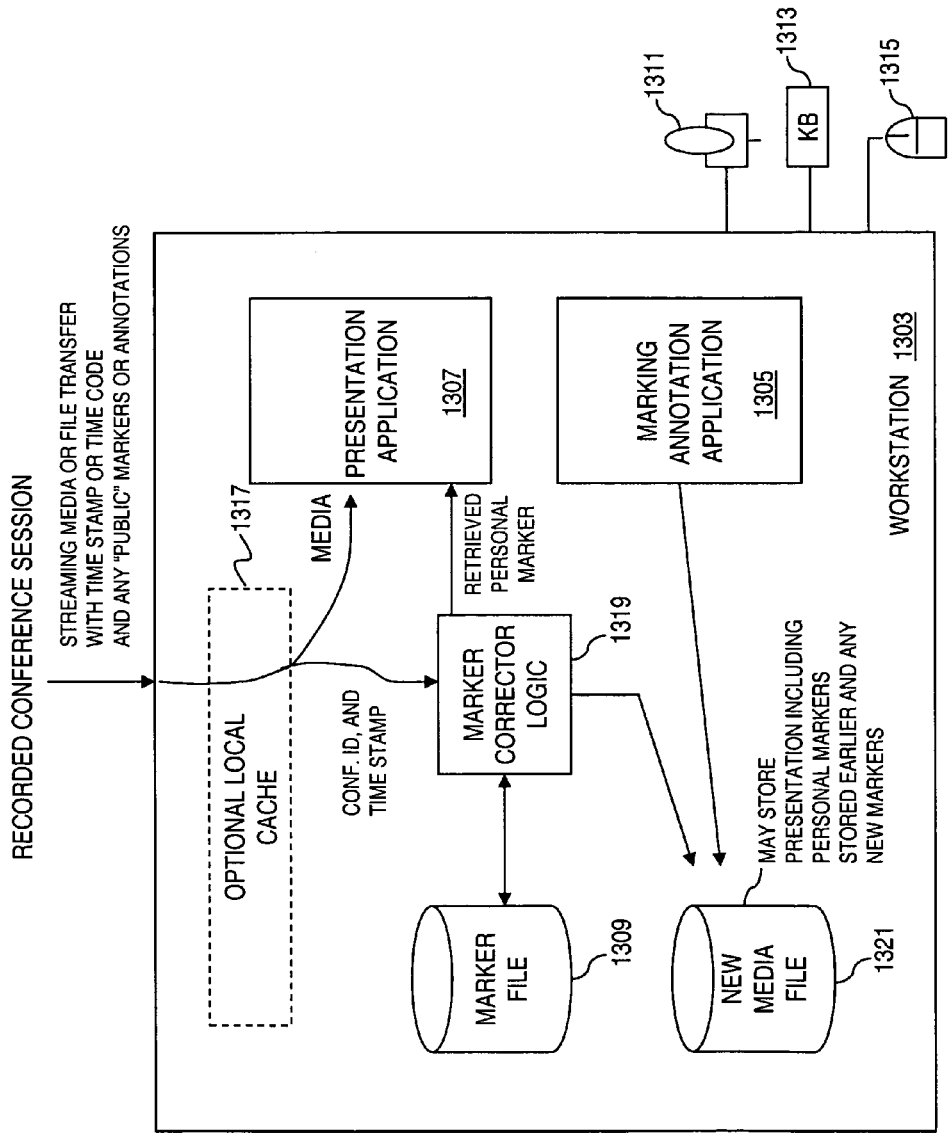

FIGS. 13A and 13B are diagrams of processes for recording and playback, respectively, of conference media, according to an embodiment of the present invention. A variety of services are provided related to recording activity that occurs during a conference or collaborative session. A conference session can be recorded on a variety of media and may include recordings of audio, video, transmitted data, software events, etc. Additional services, which can be offered by a service provider or a host of the various collaborative applications 109, include transcription, annotation and bookmarking.

The annotation and bookmarking of specific points in a session are performed before, during, or after a conference interaction and are performed by a presenter, a receiving participant, or a third party. The annotations and bookmarks may selectively be available to all participants, a selected subset of the participants or only to a single participant. In some instances, a presenter or conference leader may mark specific time offsets into a conference and make the marker information conveniently available to all participants via a recording application 1301.

In the exemplary scenario of FIG. 13A, a workstation 1303 of a participant includes a personal marking/annotation application 1305 and a conference presentation application 1307; these applications 1305, 1307 receive a conference feed. Each participant is able to insert private markers and notes that are only available to the participant using the personal marking/annotation application 1303. The personal marking/annotation application 1305 obtains time stamp information, while the conference presentation application 1307 processes the media associated with the conference session. Information identifying the conference session, marker time offset, marker name, and the actual annotation are stored in a marker file 1309.

When the conference is later played back by the participant, the private annotations and index markers applied by the participant are presented along with any shared annotations and markers that are generally available to all of the participants.

Annotations can be simple "chapter headings" or more extensive information. For example, the annotations can be textual information or involve recorded audio. A participant engaged in an audio conference can momentarily "mute" the audio feed into a bridge to record or dictate a brief, private audio annotation to be associated with that point in the conference in progress. In this example, the workstation 1303 includes a microphone 1311 for providing audio annotation. Text annotation can be input using a keyboard 1313. Also, a mouse 1315 is utilized to select a marker location and type.

For parties who are participating by a conventional telephone station (not shown) with DTMF signaling and who want to provide verbal annotation during a conference, a specific DTMF key sequence (or some other in-band or out-of-band signaling mechanism) is used to cause the telephone's microphone to be momentarily decoupled from being input to the bridge so that the caller's voice are separately recorded. The verbal annotations are intercepted and recorded by the conferencing system and stored in a file to be later accessed or downloaded by the participant who recorded the annotation or by others, if so authorized. To conclude the verbal annotation, the caller may press another key sequence.

To prevent the DTMF tones or other in-band signals used in this manner from interrupting the conference audio, the conference bridge are designed with a modified gating behavior so that it recognizes and switches to a dominant signal only if the signal does not conform to the standard frequencies and amplitudes specified for DTMF tones. In the case of a bridge that mixes signals rather than switching on a dominant signal, each audio input may undergo signal processing, with a slight delay, to detect and squelch such tones before they enter the audio program that is heard by all of the bridge participants.

It is noted that recording of a conference or collaboration may extend to textual transcription and meeting notes, either of which are offered as a service by another party or commercial service provider.

With respect to the playback of the annotated conference session, the workstation 1303 receives the recorded conference session, which is stored remotely by the recording application 1301. For example, the service provider can elect to store recorded conferences in the database 111 (of FIG. 1). This session can be transmitted to the workstation 1303 in any number of media, such as a streaming media or file transfer. In addition, public markers and annotations, if any, are provided. The workstation 1303 can store the conference session file in a local cache 1317 for retrieval by a marker corrector logic 1319. The logic 1319 generates a new media file 1321 with all the markers (both public and personal) and the public and personal annotations.

In some instances it is advantageous to integrate conferencing, collaboration, scheduling and instant communications with other applications. For example, information maintained in a database application, such as Microsoft Access, Microsoft Active Directory, X.500/(Lightweight Directory Access Protocol (LDAP), may be accessible to these communications-oriented tools. This might enable a scenario wherein an account executive may, with a single action, initiate a communication session with a customer and have the appropriate cognizant engineer or salesman automatically included in the session. The engineer associated with the customer, as well as the contact information for the engineer, may be obtained from a table in the database. The database may be primarily maintained for reasons other than such communications but may nevertheless be tapped in this manner to facilitate communications sessions.

A wide variety of PC-based and mainframe database applications could be accessed. In the case of MS Access, the Jet database DLL functions may be called from Visual Basic or compiled executable code with appropriate link libraries. In general, many methods of accessing or providing database contents are well known among those of ordinary skill.

Figure 14:
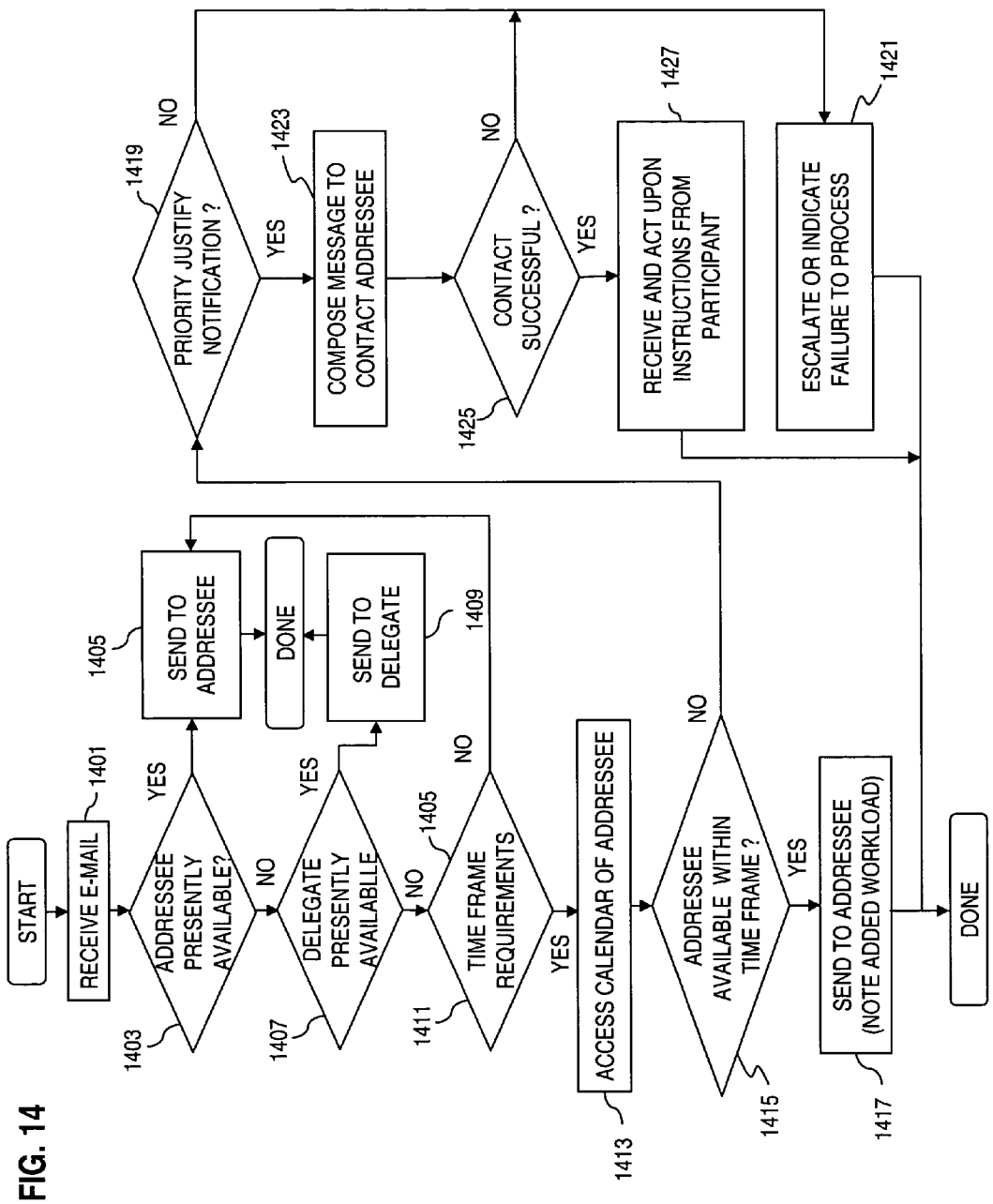
FIG. 14 is a flowchart of a process for providing e-mail, workflow, and presence integration, according to an embodiment of the present invention.

FIG. 14 is a flowchart of a process for providing e-mail, workflow, and presence integration, according to an embodiment of the present invention. The integration of conferencing, collaboration, scheduling and instant communications applications with other desktop applications can leverage the co-existence of these applications. One such application is e-mail in conjunction with the conferencing system to facilitate workflow management. By way of example, the process of FIG. 14 is described with respect to an e-mail application. In the alternative, chat applications can be utilized in lieu of or in addition to e-mail. A workflow application is a business process automation tool for handling the routing of work items among different departments or individuals in an organization to implement a consistent business process. One example of a workflow application is the FlowMark application offered by IBM Corporation. Inputs to a workflow application are used to affect the routing of communications.

In response to receiving an e-mail corresponding to a work item (step 1401), the process sends the work item to an addressee specified as one of the e-mail recipients. In step 1403, it is determined whether the addressee is presently available. If the addressee is available based on the presence information conveyed by the conferencing system, the work item is forwarded to the addressee, per step 1405.

If the addressee has established a delegation in a workflow tool such that inbound work items pertaining to a given project are routed to the delegate, then communications traffic such as e-mail, messaging, and meeting notifications pertaining to the project might also be channeled to the delegate. There may also be an overarching delegation from one person to another at an organizational level. Delegation may also be multi-layered, meaning different delegations may selectively apply to communications, signature authority, workflow, etc. In the case where the addressee has an associated delegate who can act on behalf of the addressee, the delegate's availability is determined, per step 1407. The work item is then sent to the delegate, as in step 1409, if the delegate is available.

In step 1411, the process checks whether there are time frame requirements associated with the work item. The work item is sent to the addressee, per step 1405, if no time frame requirements are imposed. Workflow processing is made presence-aware by interaction with Presence and IM server 129 or NS/RS 131. When an item of work needs to go to any one of several people in a department and needs to be handled immediately, presence information may contra-indicate individuals who either are not registered as being available or who are known to be occupied elsewhere, perhaps offsite or in a conference or meeting. The user's personal calendar is consulted in this determination as well.

In other instances, presence information is obtained for a particular person to whom a given work item must be routed. If the person is not indicated as being available by conventional means (e-mail, messaging), a personal calendar may then be consulted to determine how soon the person might have unscheduled time to be able to address the work item. This is compared against the time frame allowed for processing the item and the relative importance of adhering to that time frame. If it is imperative that the item be handled within 24 hours and the addressee is out of the office for several days, then a delegate is sought. If no delegation has been provided or the delegate is similarly unavailable, then a more extensive procedure is undertaken to reach the addressee by an NS/RS-driven "find-me" function involving phone, paging, etc. so that they may handle the item in some fashion.

If there are time frame requirements, the calendar of the participant is accessed, per step 1413. Based upon the calendar information, it is determined whether the addressee will be available within the time frame requirement (step 1415). If the schedule permits, the work item is transmitted to the addressee, as in step 1417.

Depending upon implementation and circumstances, the person may have options such as handling the item remotely, delegating the task remotely or indicating that further action on the item by the workflow application is to be withheld for the time being. If the work is sufficiently important and the person who needs to handle the item cannot be contacted, the matter is escalated to a supervisor to ensure that the work item is processed.

Specifically, in the event that the addressee is not available within the time frame, the process determines whether the work item is of sufficient priority to justify immediately notifying the addressee, step 1419, by any available communication modes. If not, the request can be escalated or an indication is provided that the request for handling the work item cannot be processed, per step 1421. In step 1423, a message is prepared for notifying the addressee that the work item has been received and that, based on calendar or presence information, that the work item may need to be handled before the addressee returns to the office or is otherwise made available. Per steps 1425 and 1427, if the addressee is successfully notified, appropriate instructions are provided by the addressee to take the proper action on the work item.

The system of FIG. 1 provides for a person contacted in this manner to instruct the workflow application as to how the item should be handled. This interaction may take place through two-way paging, push-to-talk wireless device, telephone call to a VRU platform, e-mail, instant messaging, etc.

Another way that the workflow tool may operate is to allow the work item to be queued for a certain number of hours or days and to exercise progressively more aggressive measures (resort to immediate "find-me" function) to reach the responsible party as a deadline draws nearer. The workflow system may even, in a sense, "camp on" to a user's presence indication and provide notification to the user the instant they become available in some fashion.

Figure 15:
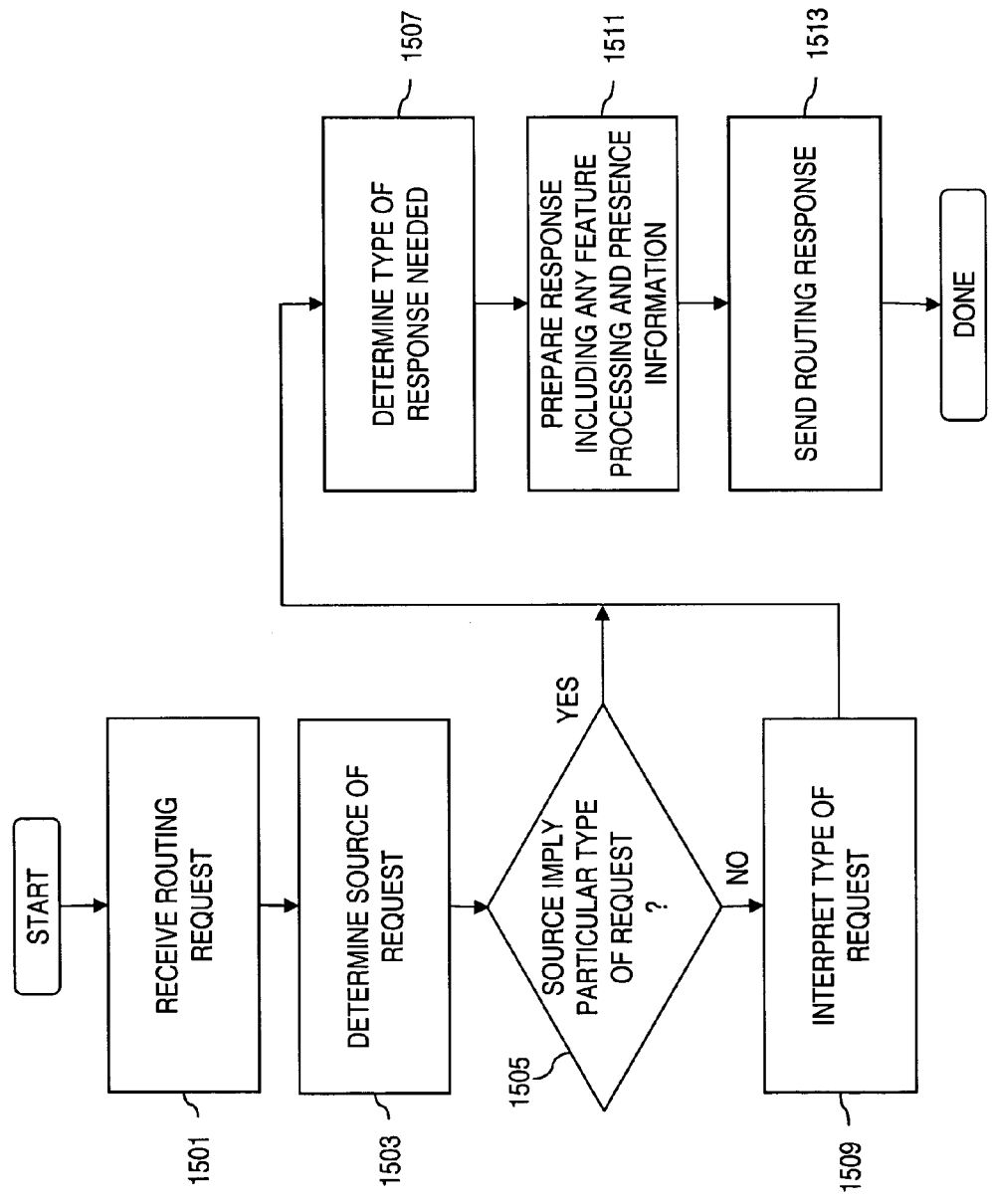
FIG. 15 is a flowchart of a process performed by a redirect server or location server to provide differentiated responses, according to an embodiment of the present invention.

FIG. 15 is a flowchart of a process performed by a redirect server or location server to provide differentiated responses, according to an embodiment of the present invention. As stated before, the redirect server functionality of the NS/RS 131 (of FIG. 1) maintains up-to-date information about how to reach a given user or location, as well as profile information that affects contact information that may be applicable to a user at any point in time. In the development of SIP technologies, the redirect server has thus far been dedicated to responding to requests from a SIP proxy and has conformed to formatting and semantics appropriate to supporting SIP signaling techniques.

In some respects, the information maintained by the RS and provided upon request by other functions is similar to information maintained in the Presence and IM server 129. Furthermore, a wide variety of functional components and applications shown in FIG. 1 may need to access such information or receive contact information that is subject to profiles and features operable within an RS 131 or similar functionality. Accordingly, RS 131, according to an embodiment of the present invention, may be modified to provide a form of redirect or location server, which provides differentiated responses depending upon the type of information that is sought, the type of communications modality to which a request pertains, the type of server or application making the request, or other circumstances pertaining to the request for information solicited from the RS.

In step 1501, a routing request is received. The request may originate from an NS or SIP proxy server (e.g., NS/RS 131). In addition, the routing request may stem from any one of a number of other functions of the system of FIG. 1. For example, the conference scheduling application 101 may call upon a redirect server or location server in the course of dispatching invitations to various invitees to a given event. In response, the redirect server or location server may provide a mixture of telephone, paging, instant messaging contact information or other addresses appropriate for other modes of communication. It should be particularly noted that such response to the conference scheduling application 101 for a given user may well be different than the response that would be given to an NS or SIP proxy server at the same moment in time for the same user. Furthermore, the response to the conference scheduling application 101 and the response to the SIP proxy server may be affected by the same feature set or profile options configured for the user or may be handled by different features or profiles. It is also contemplated that the same feature or profile option may handle the two types of requests differently. For example, even though both responses may include telephone contact information, the complement of telephone contacts provided may be different for a live originator versus an automatic meeting notification application.

After the receiving of a routing request, the source of the request is determined, per step 1503. Next, in step 1505, it is determined whether the source of the request implies a particular form or type of request, which may have an effect upon how the redirect server responds to the request. If the source of the request directly determines the nature of the request and how it is to be handled, then the type of response required is determined, as in step 1507. Otherwise, if the type of request cannot be inferred merely from the source of the request, then the request may be parsed or analyzed to interpret the type of request that has been submitted, per step 1509. For example, the process may differentiate a request from a SIP proxy seeking to establish a streaming media session versus a request from a calendar scheduling application which is trying to send out meeting notifications using both real-time and non-real-time (e-mail, paging) communications. The formats of these requests may be quite similar and differentiated by the content of particular fields or header information in the requests. In some cases, all requests serviced by the redirect server may be submitted in a generally consistent format, such as a SIP message, but may be differentiated by the presence of, or values of, specific headers in the SIP message. In other implementations, requests to the redirect server may be received in a variety of formats to better accommodate the native capabilities and protocols used by the various requesters. Whereas a SIP proxy server may submit requests in a format similar to a SIP "INVITE" message, other processes or applications may submit requests in the form of XML, Java byte code, arbitrarily formatted flat text, data structures having particular formats and semantics, telephony signaling messages, or virtually any other format that can be used to achieve data communication as will be appreciated by those of ordinary skill in the art.

Whether the request requires interpretation, or such interpretation is unnecessary due to the source of the request, in step 1511, a response appropriate for the request is prepared, accounting for the formatting of the response as well as the complement of features, profile and presence information. The response may also relate to the nature of the request, for example, whether the contact that is sought relates to establishing a real-time telephony communication from a live originator as opposed to a meeting notification being sent out by an automated application. Thereafter, the response is sent to the requestor, as in step 1513.

Figure 16:
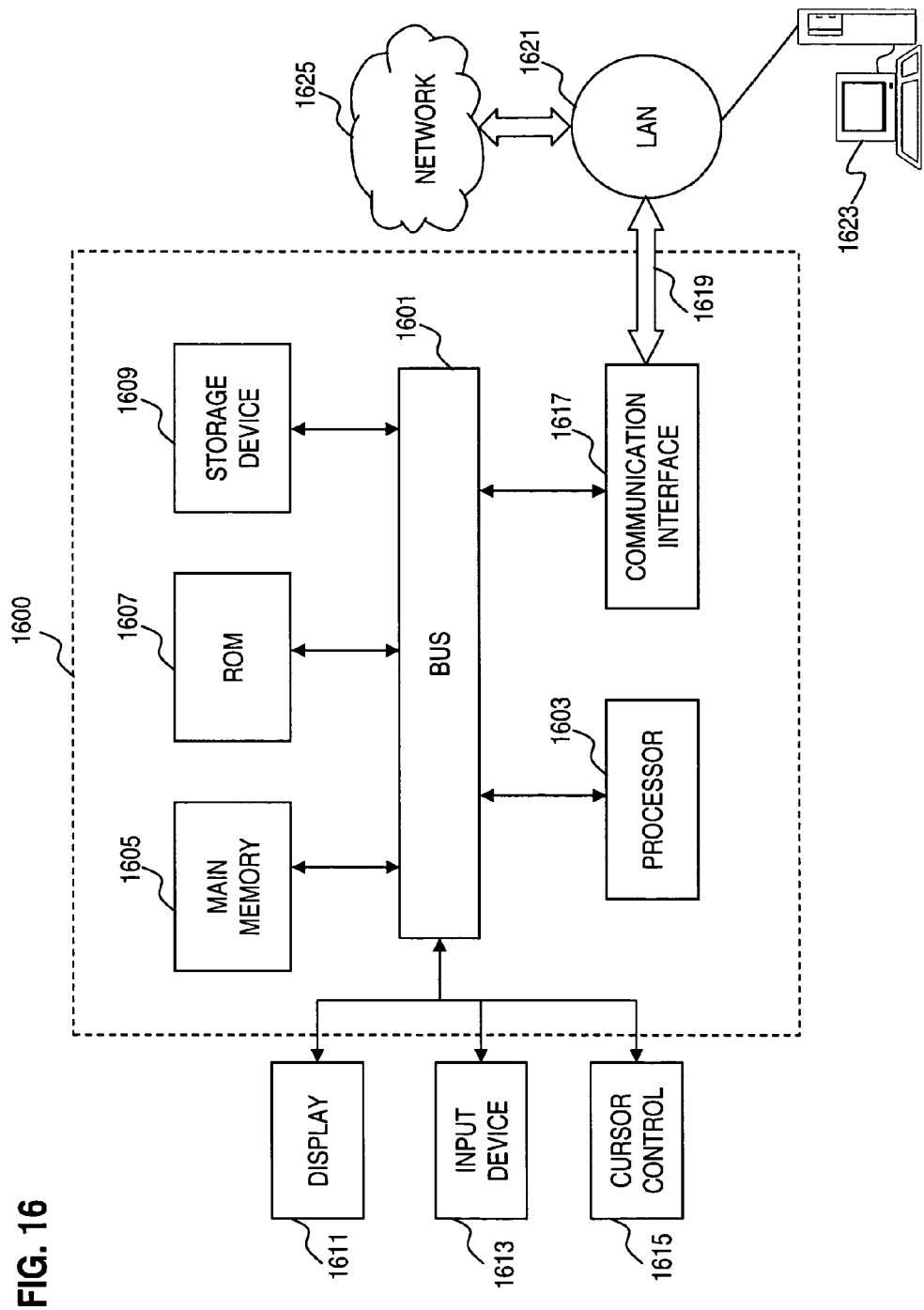
FIG. 16 is a diagram of a computer system that can be used to implement an embodiment of the present invention.

FIG. 16 illustrates a computer system 1600 upon which an embodiment according to the present invention can be implemented. For example, the client and server processes for supporting fleet and asset management can be implemented using the computer system 1600. The computer system 1600 includes a bus 1601 or other communication mechanism for communicating information and a processor 1603 coupled to the bus 1601 for processing information. The computer system 1600 also includes main memory 1605, such as a random access memory (RAM) or other dynamic storage device, coupled to the bus 1601 for storing information and instructions to be executed by the processor 1603. Main memory 1605 can also be used for storing temporary variables or other intermediate information during execution of instructions by the processor 1603. The computer system 1600 may further include a read only memory (ROM) 1607 or other static storage device coupled to the bus 1601 for storing static information and instructions for the processor 1603. A storage device 1609, such as a magnetic disk or optical disk, is coupled to the bus 1601 for persistently storing information and instructions.

The computer system 1600 may be coupled via the bus 1601 to a display 1611, such as a cathode ray tube (CRT), liquid crystal display, active matrix display, or plasma display, for displaying information to a computer user. An input device 1613, such as a keyboard including alphanumeric and other keys, is coupled to the bus 1601 for communicating information and command selections to the processor 1603. Another type of user input device is a cursor control 1615, such as a mouse, a trackball, or cursor direction keys, for communicating direction information and command selections to the processor 1603 and for controlling cursor movement on the display 1611.

According to one embodiment of the invention, the processes of the conferencing system are performed by the computer system 1600, in response to the processor 1603 executing an arrangement of instructions contained in main memory 1605. Such instructions can be read into main memory 1605 from another computer-readable medium, such as the storage device 1609. Execution of the arrangement of instructions contained in main memory 1605 causes the processor 1603 to perform the process steps described herein. One or more processors in a multi-processing arrangement may also be employed to execute the instructions contained in main memory 1605. In alternative embodiments, hard-wired circuitry may be used in place of or in combination with software instructions to implement the embodiment of the present invention. Thus, embodiments of the present invention are not limited to any specific combination of hardware circuitry and software.

The computer system 1600 also includes a communication interface 1617 coupled to bus 1601. The communication interface 1617 provides a two-way data communication coupling to a network link 1619 connected to a local network 1621. For example, the communication interface 1617 may be a digital subscriber line (DSL) card or modem, an integrated services digital network (ISDN) card, a cable modem, a telephone modem, or any other communication interface to provide a data communication connection to a corresponding type of communication line. As another example, communication interface 1617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1617 sends and receives electrical, electromagnetic, or optical signals that carry digital data streams representing various types of information. Further, the communication interface 1617 can include peripheral interface devices, such as a Universal Serial Bus (USB) interface, a PCMCIA (Personal Computer Memory Card International Association) interface, etc. Although a single communication interface 1617 is depicted in FIG. 16, multiple communication interfaces can also be employed.

The network link 1619 typically provides data communication through one or more networks to other data devices. For example, the network link 1619 may provide a connection through local network 1621 to a host computer 1623, which has connectivity to a network 1625 (e.g. a wide area network (WAN) or the global packet data communications network now commonly referred to as the "Internet") or to data equipment operated by a service provider. The local network 1621 and the network 1625 both use electrical, electromagnetic, or optical signals to convey information and instructions. The signals through the various networks and the signals on the network link 1619 and through the communication interface 1617, which communicate digital data with the computer system 1600, are exemplary forms of carrier waves bearing the information and instructions.

The computer system 1600 can send messages and receive data, including program code, through the network(s), the network link 1619, and the communication interface 1617. In the Internet example, a server (not shown) might transmit requested code belonging to an application program for implementing an embodiment of the present invention through the network 1625, the local network 1621 and the communication interface 1617. The processor 1603 may execute the transmitted code while being received and/or store the code in the storage device 1609, or other non-volatile storage for later execution. In this manner, the computer system 1600 may obtain application code in the form of a carrier wave.

The term "computer-readable medium" as used herein refers to any medium that participates in providing instructions to the processor 1605 for execution. Such a medium may take many forms, including but not limited to non-volatile media, volatile media, and transmission media. Non-volatile media include, for example, optical or magnetic disks, such as the storage device 1609. Volatile media include dynamic memory, such as main memory 1605. Transmission media include coaxial cables, copper wire and fiber optics, including the wires that comprise the bus 1601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for providing multi-media conferencing, the method comprising:
   receiving textual information for display during a conference session among a plurality of participants;
   retrieving configuration information specifying language assistance for the textual information, wherein the configuration information is associated with one of the participants;
   augmenting the textual information according to the configuration information for comprehension of the textual information by the one participant, wherein the augmenting of the textual information includes
      determining whether the textual information is contained in a predetermined list of terms and associated supplemental information, wherein the supplemental information includes definitions of the corresponding terms, and
      marking the textual information to notify the one participant that the supplemental information is available for selective display if the textual information is in the list; and
   forwarding the textual information having the marking to the one participant for display during the conference session without replacement of the textual information.

2. A method according to claim 1, wherein the configuration information specifies type of language, the method further comprising:
   translating the textual information according to the type of language, the augmented textual information including the translated textual information.

3. A method according to claim 1, wherein one of the terms is an acronym.

4. A method according to claim 1, further comprising:
   transmitting a plurality of invitation messages to the participants; and
   determining confirmation status of the conference session based upon response messages received from the participants in response to the invitation messages.

5. A method according to claim 4, wherein the invitation messages are transmitted over one of a plurality of transmission mechanisms including e-mail, page, instant messaging, and Internet Protocol (IP) telephony.

6. A method according to claim 1, wherein the conference session is established collaboratively.

7. A method according to claim 1, the method further comprising:
   recording the conference session;
   marking the recorded conference session; and
   selectively providing marking information to one or more of the participants.

8. A method according to claim 7, wherein each of the participants records individual annotations for the conference session for subsequent individual playback including the individual annotations.

9. A method according to claim 1, the method further comprising:
   monitoring service quality of the conference session experienced by the one participant.

10. A method according to claim 1, wherein the one participant automatically joins the conference session by selecting an icon on an electronic calendar.

11. A method according to claim 1, wherein an icon displayed to the one participant is responsive to whether the conference session is active.

12. A method according to claim 1, wherein an icon displayed to the one participant is responsive to whether recorded information pertaining to conduct of the conference session is available to the participant.

13. A method according to claim 1, wherein an icon displayed to the one participant is responsive to at least one of the start time of the conference session, the stop time of the conference or the duration of the conference.

14. A method according to claim 1, the method further comprising:
   determining billing information associated with the conferencing session for charging an account of the one participant.

15. A method according to claim 14, the method further comprising:
   determining whether the account is valid, wherein the augmented textual information is forwarded to the one participant only if the account is valid.

16. A method according to claim 1, wherein the augmenting of the textual information further includes setting one or more of a size, a resolution, and a color format of the textual information for display in accordance with a type of device.

17. A method according to claim 1, further comprising forwarding the supplemental information to the one participant for display during the conference session when the one participant selects the supplemental information for display using the marking in the textual information.

18. A system for providing multi-media conferencing, the system comprising one or more processors having:
   a conference scheduling application configured to receive textual information for display during a conference session among a plurality of participants, and to retrieve configuration information specifying language assistance for the textual information, wherein the configuration information is associated with one of the participants; and
   a language assistance application configured to augment the textual information according to the configuration information for comprehension of the textual information by the one participant, wherein the language assistance application determines whether the textual information is contained in a predetermined list of terms and associated supplemental information, and if the textual information is in the list, the language assistance application marks the textual information to notify the one participant that the supplemental information is available for selective display, the supplemental information including definitions of the corresponding terms, and
   wherein the textual information having the marking is forwarded to the one participant for display during the conference session without replacement of the textual information.

19. A system according to claim 18, wherein the configuration information specifies type of language, and the language assistance application translates the textual information according to the type of language, the augmented textual information including the translated textual information.

20. A system according to claim 18, wherein one of the terms is an acronym.

21. A system according to claim 18, wherein the conference scheduling application is further configured to transmit a plurality of invitation messages to the participants, and to determine confirmation status of the conference session based upon response messages received from the participants in response to the invitation messages.

22. A system according to claim 21, wherein the invitation messages are transmitted over one of a plurality of transmission mechanisms including e-mail, page, instant messaging, and Internet Protocol (IP) telephony.

23. A system according to claim 18, wherein the conference session is established collaboratively.

24. A system according to claim 18, wherein the conference scheduling application is further configured to record the conference session, mark the recorded conference session, and selectively provide marking information to one or more of the participants.

25. A system according to claim 24, wherein each of the participants records individual annotations for the conference session for subsequent individual playback including the individual annotations.

26. A system according to claim 18, wherein the conference scheduling application is further configured to monitor service quality of the conference session experienced by the one participant.

27. A system according to claim 18, wherein the one participant automatically joins the conference session by selecting an icon on an electronic calendar.

28. A system according to claim 18, wherein an icon displayed to the one participant is responsive to whether the conference session is active.

29. A system according to claim 18, wherein an icon displayed to the one participant is responsive to whether recorded information pertaining to conduct of the conference session is available to the participant.

30. A system according to claim 18, wherein an icon displayed to the one participant is responsive to at least one of the start time of the conference session, the stop time of the conference or the duration of the conference.

31. A system according to claim 18, further comprising:
   a billing system configured to determine billing information associated with the conferencing session for charging an account of the one participant.

32. A system according to claim 31, wherein the billing system determines whether the account is valid, the augmented textual information being forwarded to the one participant only if the account is valid.

33. A system according to claim 18, wherein the augmenting of the textual information further includes setting one or more of a size, a resolution, and a color format of the textual information for display in accordance with a type of device.

34. A system according to claim 18, wherein the supplemental information is forwarded to the one participant for display during the conference session when the one participant selects the supplemental information for display using the marking in the textual information.

35. A computer-readable storage medium carrying one or more sequences of one or more instructions for providing multi-media conferencing, the one or more sequences of one or more instructions including instructions which, when executed by one or more processors, cause the one or more processors to perform the steps of:
   receiving textual information for display during a conference session among a plurality of participants;
   retrieving configuration information specifying language assistance for the textual information, wherein the configuration information is associated with one of the participants;
      augmenting the textual information according to the configuration information for comprehension of the textual information by the one participant, wherein the augmenting of the textual information includes
      determining whether the textual information is contained in a predetermined list of terms and associated supplemental information, and
      marking the textual information to notify the one participant that the associated supplemental information is available for selective display if the textual information is in the list; and
   forwarding the textual information having the marking to the one participant for display during the conference session without replacement of the textual information.

36. A computer-readable storage medium according to claim 35, wherein the configuration information specifies type of language, the computer-readable medium further including instructions for causing the one or more processors to perform the step of:
   translating the textual information according to the type of language, the augmented textual information including the translated textual information.

37. A computer-readable storage medium according to claim 35, wherein the supplemental information includes definitions of the corresponding terms, one of the terms being an acronym.

38. A computer-readable storage medium according to claim 35, further including instructions for causing the one or more processors to perform the steps of:
   transmitting a plurality of invitation messages to the participants; and
   determining confirmation status of the conference session based upon response messages received from the participants in response to the invitation messages.

39. A computer-readable storage medium according to claim 38, wherein the invitation messages are transmitted over one of a plurality of transmission mechanisms including e-mail, page, instant messaging, and Internet Protocol (IP) telephony.

40. A computer-readable storage medium according to claim 35, wherein the conference session is established collaboratively.

41. A computer-readable storage medium according to claim 35, further including instructions for causing the one or more processors to perform the steps of:
   recording the conference session;
   marking the recorded conference session; and
   selectively providing marking information to one or more of the participants.

42. A computer-readable storage medium according to claim 41, wherein each of the participants records individual annotations for the conference session for subsequent individual playback including the individual annotations.

43. A computer-readable storage medium according to claim 35, further including instructions for causing the one or more processors to perform the step of:
   monitoring service quality of the conference session experienced by the one participant.

44. A computer-readable storage medium according to claim 35, wherein the one participant automatically joins the conference session by selecting an icon on an electronic calendar.

45. A computer-readable storage medium according to claim 35, wherein an icon displayed to the one participant is responsive to whether the conference session is active.

46. A computer-readable storage medium according to claim 35, wherein an icon displayed to the one participant is responsive to whether recorded information pertaining to conduct of the conference session is available to the participant.

47. A computer-readable storage medium according to claim 35, wherein an icon displayed to the one participant is responsive to at least one of the start time of the conference session, the stop time of the conference or the duration of the conference.

48. A computer-readable storage medium according to claim 35, further including instructions for causing the one or more processors to perform the step of:
   determining billing information associated with the conferencing session for charging an account of the one participant.

49. A computer-readable storage medium according to claim 48, further including instructions for causing the one or more processors to perform the step of:
   determining whether the account is valid, wherein the augmented textual information is forwarded to the one participant only if the account is valid.

50. A storage medium according to claim 35, wherein the augmenting of the textual information further includes setting one or more of a size, a resolution, and a color format of the textual information for display in accordance with a type of device.

51. A storage medium according to claim 35, further including instructions for causing the one or more processors to perform the step of forwarding the supplemental information to the one participant for display during the conference session when the one participant selects the supplemental information for display using the marking in the textual information.

* * * * *